United States Patent
Blankenship

(10) Patent No.: US 7,032,814 B2
(45) Date of Patent: *Apr. 25, 2006

(54) CODED WELDING CONSUMABLE

(75) Inventor: George D. Blankenship, Chardon, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 10/603,563

(22) Filed: Jun. 25, 2003

(65) Prior Publication Data

US 2004/0004113 A1 Jan. 8, 2004

Related U.S. Application Data

(60) Continuation-in-part of application No. 09/842,103, filed on Apr. 26, 2001, now Pat. No. 6,536,660, which is a division of application No. 09/336,574, filed on Jun. 21, 1999, now Pat. No. 6,267,291.

(51) Int. Cl.
*G06F 17/00* (2006.01)
(52) U.S. Cl. .................. 235/375; 235/449; 219/54
(58) Field of Classification Search ................ 235/375, 235/493, 494, 462.13, 487; 219/54, 130.5, 219/60 R, 69.1
See application file for complete search history.

(56) References Cited

U.S. PATENT DOCUMENTS

| 2,488,717 | A | 11/1949 | Ellenberger |
| 3,581,050 | A | 5/1971 | Brown et al. |
| 3,581,051 | A | 5/1971 | Brown |
| 4,000,374 | A | 12/1976 | De Keyser |
| 4,190,890 | A | 2/1980 | Marx |
| 4,415,792 | A | 11/1983 | Jordan |
| 4,458,135 | A | 7/1984 | Guichard |
| 4,527,045 | A | 7/1985 | Nakajima et al. |
| 4,587,407 | A | 5/1986 | Ahmed et al. |
| 4,608,482 | A | 8/1986 | Cox et al. |
| 4,767,913 | A | 8/1988 | Weber et al. |
| 4,791,284 | A | 12/1988 | Ludden |
| 4,868,366 | A | 9/1989 | Joseph et al. |
| 4,879,457 | A | 11/1989 | Ludden |

(Continued)

FOREIGN PATENT DOCUMENTS

CA 2189595 6/1997

(Continued)

OTHER PUBLICATIONS

Linking ideas, Information and Solutions—Texas Instruments, Tiris™ Radio Frequency Identification Solutions Brochure.

(Continued)

*Primary Examiner*—Ahshik Kim
(74) *Attorney, Agent, or Firm*—Fay Sharpe Fagan Minnich & McKee; Brian E. Turung; Robert V. Vickers

(57) ABSTRACT

Information pertaining to characteristics of consumables such as metal welding electrode wire and shielding gas and which characteristics are useful in connection with adjusting welding parameters in an arc welding process and/or selecting between operating modes in a welding system are encoded on welding wire and/or on other memory components such as bar code labels and tags, RFID cards and tags, IC cards, and Touch Memory buttons, and the memory device is scanned prior to and/or at the point of use of the welding wire or shielding gas for enabling tracking of product distribution, manual and/or automatic selection of an operating mode for the welding system, manual and/or automatic adjustment of welding parameters in a given operating mode, consumables inventory, and the like.

65 Claims, 12 Drawing Sheets

U.S. PATENT DOCUMENTS

| | | | |
|---|---|---|---|
| 4,960,983 | A | 10/1990 | Inoue |
| 4,976,179 | A | 12/1990 | Lacrouts-Cazenave |
| 5,151,684 | A | 9/1992 | Johnsen |
| 5,278,390 | A | 1/1994 | Blankenship |
| 5,349,156 | A | 9/1994 | Madigan |
| 5,481,100 | A | 1/1996 | Terauchi |
| 5,497,140 | A | 3/1996 | Tuttle |
| 5,500,512 | A | 3/1996 | Goldblatt |
| 5,553,810 | A | 9/1996 | Bobeczko |
| 5,571,431 | A | 11/1996 | Lantieri |
| 5,583,819 | A | 12/1996 | Roesner et al. |
| 5,630,955 | A * | 5/1997 | Kosaka et al. ........... 219/130.4 |
| 5,692,700 | A | 12/1997 | Bobeczko |
| 5,831,827 | A | 11/1998 | Fekete |
| 5,841,104 | A | 11/1998 | Svensson |
| 5,981,906 | A | 11/1999 | Parker |
| 6,002,104 | A | 12/1999 | Hsu |
| 6,091,048 | A * | 7/2000 | Lanouette et al. ..... 219/130.21 |
| 6,096,994 | A | 8/2000 | Handa |
| 6,121,575 | A | 9/2000 | Ott |
| 6,198,071 | B1 | 3/2001 | Kitsunai |
| 6,225,597 | B1 | 5/2001 | Kawamoto |
| 6,267,291 | B1 * | 7/2001 | Blankenship et al. ....... 235/375 |
| 6,278,082 | B1 * | 8/2001 | Shimogama ............. 219/130.5 |
| 6,510,984 | B1 * | 1/2003 | Blankenship et al. ....... 235/375 |
| 6,515,693 | B1 | 2/2003 | Haas |
| 6,536,660 | B1 | 3/2003 | Blankenship et al. |
| 6,708,877 | B1 * | 3/2004 | Blankenship et al. ....... 235/375 |
| 6,858,817 | B1 * | 2/2005 | Blankenship et al. .... 219/130.5 |

FOREIGN PATENT DOCUMENTS

| | | |
|---|---|---|
| EP | 0878263 | 11/1998 |
| EP | 0901865 | 3/1999 |

OTHER PUBLICATIONS

Indala Industrial Products—RFID Radio Frequency Identification, © 1998 Motorola, Inc. Brochure.

Electro-Magnetic RFID: Everything You Need to Know About Inductively coupled RFID, Smartcard Solutions, © 1196, 1997, 1999 Motorola, Inc. Brochure.

BiStatix—A Breakthrough Solution for Automated Data Capture Brochure.

50 Ways to Touch Memory, Third Edition, From the company that took the memory out of the computer, Dallas Semiconductor, © Copyright 1994 Dallas SemiConductor Corporation, Dallas, Texas.

* cited by examiner

CODED WELDING CONSUMABLE

The present invention is a continuation-in-part of U.S. patent application Ser. No. 09/842,103 filed Apr. 26, 2001 entitled "CODED AND ELECTRONICALLY TAGGED WELDING WIRE," now U.S. Pat. No. 6,536,660 which is a divisional of U.S. patent application Ser. No. 09/336,574 filed Jun. 21, 1999, now U.S. Pat. No. 6,267,291.

INCORPORATION BY REFERENCE

Incorporated herein by reference for background information is U.S. Pat. No. 5,692,700 to Bobeczko which is assigned to the assignee of the present application and which discloses the provision of a bar code on a cover and/or reel to identify the type and size of the welding wire on the reel. Also incorporated by reference is Blankenship U.S. Pat. No. 6,267,291 which is assigned to the assignee of the present application and which discloses the encoding of filler wire to control an automatic or semi-automatic welding apparatus.

BACKGROUND OF THE INVENTION

This invention relates to the art of welding and, more particularly, to the encoding of metal welding wire with information pertaining thereto, and to the monitoring and/or controlling of automatic or semi-automatic welding apparatuses and processes based on the information extracted from a coded welding wire or from other electronically readable information storage devices encoded with information pertaining to a given welding wire.

The present invention is particularly applicable to the encoding and use of coded filler wire and other electronically readable information storage devices in connection with controlling automatic or semiautomatic arc welding apparatuses and processes based on information pertaining to the welding wire. Accordingly, the invention will be described with reference to such welding wire information and the storage and use thereof in conjunction with manual and/or automatic control of a welding process or apparatus.

Electric arc welding is a complicated process wherein numerous interrelated and non-interrelated parameters affect the deposition of molten metal to a weld pool in performing a welding operation. One such parameter is the welding wire to be used and, in particular, information pertaining thereto which is useful, for example, in determining processes and apparatuses in which its use is best suited and processes and/or apparatus operating parameters for a given wire. Other information, such as the date and time of manufacture, the manufacturing location and the like, can assist in tracing the origin of the wire should a problem occur requiring contact with the manufacturer. Further, information such as the alloy type, wire diameter, control numbers, lubrication levels, and the like is valuable for controlling a given process or apparatus so as to optimize performance and weld quality.

In particular, the quality of automated welding is significantly affected by variations in the welding wire diameter which can vary by +/−0.001 inch and still be within welding wire specifications, and such a variation can change the deposition rate by as much as six percent for 0.035 inch diameter wire. Welding wire is drawn, and such diameter variations result from a manufacturer's efforts to fully extend the life of a die by starting with a die that produces slightly undersized wire within a given specification. The die progressively wears during production, whereby the wire size gradually increases and eventually becomes oversized with respect to the specification. While it is possible to tightly control the wire diameter during production such as by frequent replacement of dies, such production for most practical purposes is economically unacceptable. Another major factor affecting weld quality is a variation in the proportion of major to minor gases in the shielding gas mixture for GMAW or MIG welding. The variation of the proportion of the minor gas from a given standard therefore can significantly alter the heat input and thus the weld size, shape and quality. Still another factor affecting weld quality and/or the efficiency of the welding process is the amount of a consumable that remains during a welding process. Consumables such as the welding wire and shielding gas are consumed during a welding process. During an automatic or semi-automatic welding process, the welding process may not be closely monitored by an operator. As such, one or more of the consumables may be used up during a welding process thereby adversely affecting the weld quality. For instance, when the weld wire is fully consumed, further formation of a weld bead does not occur. Furthermore, when the shielding gas is fully consumed, the weld bead quality of the formed weld is adversely affected. In addition, when one or more consumables is fully used, the welding operation has to ultimately stopped and the consumable replaced. The stopping of the welding process reduces welding efficiencies due to unanticipated down time and can also result in partially welded workpieces having to be discarded.

In view of the state of the prior art, there is a need for a welding monitoring and/or control system to improve the efficiencies of automatic and/or semi-automatic welding processes and the quality of a formed weld bead.

SUMMARY OF THE INVENTION

In accordance with the present invention, information pertaining to a consumable of the foregoing character is encoded thereon and/or in or on electrically or electronically readable devices or components. The consumable typically includes metal welding wire and/or shielding gas. The coding can include magnetic coding, visual coding (e.g., colored marking, etc.) and/or physical coding (e.g., indents, ribs, etc.). When the encoding is included on electrically or electronically readable devices or components, such devices or components include, but are not limited to, RFID (radio frequency identification) cards or tags, bar code labels or tabs, ROM, IC (integrated circuit) plates or boards, Touch Memory buttons, and the like. Touch Memory is a registered trademark of Dallas Semiconductor Corporation of Dallas, Tex.

The information pertaining to the welding wire can be in a number of different categories including, but not limited to, generic or fixed information such as the product name and/or trademark, the package type, and/or the like; information relevant to the welding wire coiled on a given reel or in a given barrel such as the alloy chemistry thereof, the weight and/or length of the coiled wire, the date, time and/or location at which a wire was manufactured, personnel responsible for the manufacturer, and/or the like. Still another category can be variable information such as the diameter of the wire at locations therealong, the surface condition of the wire, winding or twisting conditions, out-of-roundness of the wire, the location of anomalies such as breaks in the wire, the globular to spray break over voltage, personnel changes during manufacturing, the remaining length of wire on the wire reel, end of and/or near end of wire indicator, and/or the like. In addition to encoding information of the foregoing character at the time of manufacturer of the wire, it is also contemplated in accordance with the invention that there can be a write back of information to be recorded at the time of use of the wire, such as the date and time of use, so as to enable maintaining a log of usage, the amount used so as to enable identification of a location in the coil relative to the beginning and terminal ends of the wire, one or more welding conditions at the time of the weld formation, location information concerning the weld formation, and/or the like. The encoded information can also be used for inventory purposes and/or to track the shipment of the welding wire. With respect to inventory, the encoded information can provide the user information on how many wire reels or containers are left to thereby notify the user that additional reels or containers need to be ordered. With respect to shipping information, the encoded information can be used to track the shipment of the wire from the manufacturer or storage facility to another location.

The information pertaining to the shielding gas can be in a number of different categories including, but not limited to, generic or fixed information such as the product name and/or trademark, the package type, and/or the like; information relevant to the shielding gas in a given container, the volume and/or gas pressure of the shielding gas, the date, time and/or location at which the shielding gas was placed in the container, personnel responsible for the placement, and/or the like. Still another category can be variable information such as the pressure in the container, the temperature of the container, breaks in flow of shielding gas, personnel changes during manufacturing, the remaining amount of shielding gas in the container, and/or the like. In addition to encoding information of the foregoing character, it is also contemplated in accordance with the invention that there can be a write back of information to be recorded at the time of use of the shielding gas, such as the date and time of use, so as to enable maintaining a log of usage, the amount used, one or more welding conditions at the time of the weld formation, location information concerning the weld formation, and/or the like. The encoded information can also be used for inventory purposes and/or to track the shipment of the shielding gas. With respect to inventory, the encoded information can provide the user information on how many containers of shielding gas are left to thereby notify the user that additional containers need to be ordered. With respect to shipping information, the encoded information can be used to track the shipment of the shielding gas from the manufacturer or storage facility to another location.

The encoded information can be extracted prior to use and/or in connection with use of the wire and/or shielding gas in given welding apparatus. When extracted prior to use, the information enables an operator to manually make the necessary preliminary adjustments of the control system for the welding apparatus for obtaining optimum performance thereof, and/or to select between two or more operating modes. With respect to the encoding of information pertaining to the wire diameter, for example, the diameter can be encoded at predetermined intervals along the length of the wire as it is being manufactured, and the extracting of such information prior to initiating operation of the apparatus enables the operator to adjust parameters of the process or to anticipate times in the process where a parameter such as the speed of the wire feeding device needs to be adjusted, so as to maintain a desired deposition rate in response to diameter variations along the length of the wire. With respect to the encoding of information pertaining to the shielding gas, for example, the type of shielding gas and the pressure of the shielding gas can be encoded, and the extracting of such information prior to initiating operation of the apparatus enables the operator to adjust parameters of the process or to anticipate times in the process where a parameter such gas flow rate needs to be adjusted, so as to maintain a desired weld bead quality. When the encoded information is extracted from the wire, shielding gas or other storage device in connection with the operation of the welding apparatus, the extracted information can be used to automatically configure the control system by adjusting an appropriate parameter or parameters for optimizing the apparatus performance, or to automatically switch between different operating modes of the apparatus such as the spray arc and pulsed arc welding modes mentioned above. Such operating modes are given by way of example only, and many other modes of operation can be selected between depending on the particular welding apparatus and/or process with which the principals of the present invention are used. Likewise, the parameter of wire feed speed and shielding gas pressure are given by way of example only, and it will be appreciated that many other parameters can be controlled and/or adjusted using the principals of the present invention such as, arc voltage, arc current, wave shape, arc length or gap, to name but a few.

Typically, encoding on the welding wire or, on or in other information storage devices is achieved as the welding wire is drawn during the manufacturing process and, in connection with encoding information on the welding wire. The encoding typically is achieved by painting the wire, notching the wire and/or by imprinting magnetic pulses thereon; however, other encoding arrangements can be used. The encoding on the wire may also be achieved by Manchester encoding or MFM (modified frequency modulation) and at the point of use, the coded information can be read from the wire such as by using Hall Effect, inductive pickup coil technology or a magneto-resistive method, after which the code is deciphered and the extracted information visually inspected such as on a video screen, and/or recorded and/or transmitted to the welding apparatus to achieve the foregoing control or switching functions. The coded information can also be read by visual sensors (e.g. cameras, etc.) and/or contact sensors. When reading the wire in conjunction with the operation of welding apparatus, the reading can be accomplished, for example, at the wire feeding device and/or other location on or about the welder.

As mentioned above, the desired information pertaining to the welding wire and/or shielding gas can be encoded in a Touch Memory button, on a RFID card or tag, or on a bar code label or tag which would be scanned at the location of the welding apparatus by appropriate electronic reading devices. A Touch Memory button is a semiconductor memory chip enclosed in a stainless steel canister measuring, for example, about 16 millimeters in diameter and having a height between about three and six millimeters. It can be adhesively or otherwise mounted on an object, such as a welding wire reel, barrel, gas cylinder and can read or write in response to a momentary contact. The memory chip is typically stimulated by a five volt signal through a single wire contact and ground.

An RFID system is similar in application to bar code technology, but uses radio frequency rather than optical signals. The system comprises two major components, namely a reader and a memory tag or card, and these components work together to provide a non-contact type of information retrieval. In this respect, the reader produces a radio frequency magnetic field which is transmitted from the reader by an antenna, and the RFID card or tag contains an antenna which receives the magnetic field signal from the reader and an integrated circuit which converts the incoming signal to an electrical form. The integrated circuit memory contents are transmitted as an electromagnetic signal back to the reader wherein the signal is converted back into an electrical form after which the data is decoded and transmitted to a host computer system. RFID systems can be read only or read/write, and the tag can be either active or passive. An active tag includes a battery to produce a stronger electromagnetic return signal to the reader which increases the extent of the transmission distance between the tag and reader, and RFID systems do not require a direct contact with or a direct line of sight with the reader and are well suited for use in harsh environments. In contrast, bar code and Touch Memory systems require a relatively clean environment because they rely on optics and direct contact with the encoded component of the system.

Regardless of the information storage system used, scanning for the stored information can take place either prior to or in connection with operation of the welding apparatus to facilitate the foregoing manual or automatic adjustment of the apparatus and thus the welding process so as to manually or automatically provide a welding procedure commensurate with characteristics of the electrode. Again, such encoded information enables the manual or automatic adjustment of the apparatus prior to and/or during operation thereof to, for example, compensate for variations in the characteristics of the electrode. Additionally, the stored information typically includes data relevant to tracking, product distribution, usage, and the like which can be retrieved at any time for maintaining corresponding records including, at the point or points of usage, an inventory of the quantity of available wire and/or shielding gas.

It is accordingly an outstanding object of the present invention to provide a method and system for controlling the operation of electric arc welding processes using consumable welding wire based on encoded information pertaining to one or more consumables and extracted at the point of use and/or during use for selecting between modes of operation and/or controlling operation of a welding process based on the extracted information.

Another and/or alternative object of the present invention is the provision of a method and system of the foregoing character in which the operation of electric arc welding processes using consumable welding wire based on encoded information pertaining to the wire and which information is extracted at the point of use and/or during use for selecting between modes of operation and/or controlling operation of a welding process based on the extracted information.

Still another and/or alternative object of the present invention is the provision of a method and system of the foregoing character in which operating parameters of welding apparatus can be adjusted during operation thereof in response to extracted information pertaining to the welding wire and/or the apparatus can be shifted between different operating modes based on the extracted information.

Yet another and/or alternative object of the present invention is the provision of a method and system of the foregoing character in which operating parameters of the welding apparatus can be adjusted during operation thereof in response to extracted information pertaining to the shielding gas, and/or the apparatus can be shifted between different operating modes based on the extracted information.

Still yet another and/or alternative object of the present invention is to provide a method of encoding metal welding wire and/or the welding wire container with information pertaining to characteristics thereof and/or with information pertaining to operating parameters of a welding process with which the wire can be used.

A further and/or alternative object of the present invention is to provide a method of encoding a shielding gas container with information pertaining to characteristics thereof and/or with information pertaining to operating parameters of a welding process with which the shielding gas can be used.

Still a further and/or alternative object of the present invention is the provision of welding wire having information magnetically encoded thereon pertaining thereto.

Yet a further and/or alternative object is the provision of welding wire having information visually marked thereon pertaining thereto.

Still yet a further and/or alternative object of the present invention is the provision of an information storage system for welding wire by which a wire manufacturer can track wire production and finished goods inventory and by which a wire consumer can track wire usage and raw material inventory.

Another and/or alternative object of the present invention is the provision of an information storage system for shielding gas by which a shielding gas manufacturer can track production and finished goods inventory and by which a shielding gas consumer can track shielding gas usage and raw material inventory.

Still another and/or alternative object of the present invention is the provision of a system of encoding information relating to welding wire and/or shielding gas which enables error detection by a consumer to preclude use of the wrong welding wire and/or shielding gas in connection with a particular welding process.

Yet another and/or alternative object of the present invention is the provision of a method of controlling an electric arc welding process based on information encoded on welding wire, a welding wire container, and/or a shielding gas container used in the process.

Still yet another and/or alternative object of the present invention is the provision of a system for controlling the operation of electric arc welding apparatus based on information encoded on welding wire, a welding wire container, and/or a shielding gas container used with the apparatus.

A further and/or alternative object of the present invention is the provision of a method of operating an electric arc welding process in one of two operating modes and switching between the modes based on information encoded on welding wire, a welding wire container, and/or a shielding gas container used in the process.

Still a further and/or alternative object of the present invention is the provision of an improved method of maintaining an inventory of consumables in connection with an arc welding process.

Yet a further and/or alternative object of the present invention is the provision of an improved method of tracking information related to the shipping, manufacture and/or use of consumables.

Still yet a further and/or alternative object of the present invention is the provision of an improved method of operating an electric arc welding process by monitoring and/or detecting the end or near end of a source of a consumable in the welding process.

Another and/or alternative object of the present invention is the provision of an apparatus and method of welding that improves the quality of weld bead formation during a welding process.

Still another and/or alternative object of the present invention is the provision of an apparatus and method of welding that increases the welding efficiencies during automatic or semi-automatic welding.

These and other objects and advantages will become apparent from the discussion of the distinction between the invention and the prior art and when considering the preferred embodiment as shown in the accompanying drawings.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
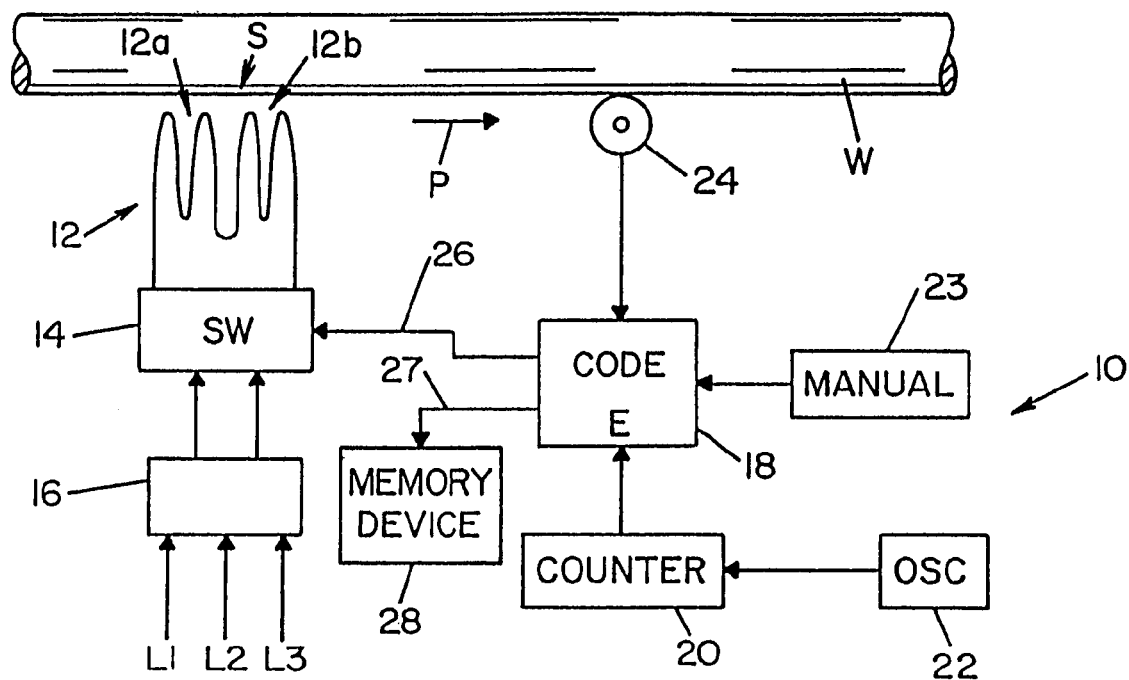
FIG. 1 schematically illustrates an apparatus for magnetically imprinting coded information on metal welding electrode wire.

Referring now in greater detail to the drawings, wherein the showings are for the purpose of illustrating preferred embodiments of the invention only and not for the purpose of limiting the invention, FIG. 1 illustrates a section of metal welding wire W which is of indeterminate length and, in connection with the manufacture thereof, is drawn and wrapped onto a spool or reel. In use, as will become apparent hereinafter, the reel is mounted on welding apparatus in association with a wire feeding device by which the wire is payed from the reel and fed to the welding station of the apparatus. As the wire is drawn in connection with the manufacturing process, it is moved along a path as indicated by arrow P in FIG. 1 and, in accordance with the present invention, relative to an encoding unit 10 provided along the path and which includes a writing component 12 at an, encoding station S along path P. In this embodiment, writing component 12 is shown as an inductor coil having adjacent, reversely wound coil portions 12a and 12b adjacent which wire W passes in moving along path P, and the encoding unit 10 further includes a switch (SW) 14 for connecting and disconnecting the inductor coil with a suitable AC power source designated by lines L1, L2 and L3 through a rectifier 16. A code to be imprinted on wire W is stored in an encoder component 18 of encoding unit 10, and the latter further includes a counter 20 which, as will become apparent hereinafter, sets the time between sequential codes imprinted on wire W, and an oscillator 22 which provides a timer for actuating counter 20.

Encoder 18 provides a predetermined menu of information and, typically, information pertaining to wire W in addition to the information in encoder 18 can be encoded on a wire at selected times during the manufacturing procedure with respect to a given coil of wire by inputting such additional information through encoder 18 via a selectively operable writing device 23. Such additional information can, for example, be information pertaining to variables and/or anomalies occurring during the manufacturing process such as variations in the diameter of the wire and the surface condition thereof, a break or breaks in the wire, change in wire composition, twist in the wire, natural curvature of the wire, end of wire indicator, amount of wire remaining, a change of personnel operating the production machinery, and the like. For example, one type of information on the wire can be inserted on the wire the last 20–100 feet of the wire to thereby indicate that the wire on a reel or in a container is about to run out. As can be appreciated, other and/or additional information can be coded on the wire. The information which is stored in encoder 18, on the other hand, is information which does not vary in connection with a given production run and which, accordingly, can include such information as the manufacturer's name and location, a product designation, a specified wire cross-section shape and/or diameter or size, the electrode composition, flux composition, wire processing line, type of wire reel or wire container, date of manufacture, and the like.

A controller 24 senses the movement of wire W along path P and operates to control stopping and starting of the encoding unit so that the latter is active only when wire W is being moved along path P. Controller 24 also operates to provide input to encoder 18 for imprinting encoded information on wire W relative to tracking the wire between the beginning and terminal ends thereof and enabling, for example, providing preselected intervals of length along the wire at which the diameter of the wire is to be determined and recorded.

Figure 2A:
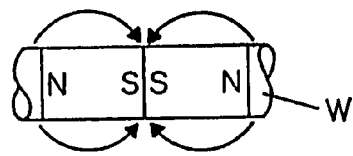
FIGS. 2A and 2B illustrate different magnetic imprints of magnetic pulses on the electrode wire using the apparatus of FIG. 1.
Figure 2B:
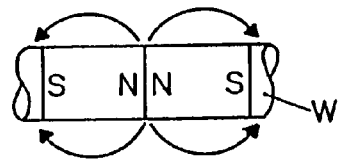

In the embodiment of FIG. 1, encoding unit 10 is operable to imprint magnetic pulses on wire W in response to the output of encoder 18 through line 26 to switch 14 and by which the switch is operated to connect coil 12 to power supply 16. As will be appreciated from FIGS. 2A and 2B, the reversed configuration of coil portion 12*a* and 12*b* relative to one another provides for the magnetic imprinting on wire W to have fields which produce local fringing of the flux to facilitate reading the coded information from the wire. The poles must line up either in a sequence of N-SS-N or a sequence of S-NN-S, and with the coil portions reversely wound as shown in FIG. 1, it will be appreciated that the sequences are dependent on the direction of flow of current through coil 12. While a single coil having reversely wound coil portions is shown in FIG. 1, the desired flux fringing can be achieved using two coils.

Figure 3:
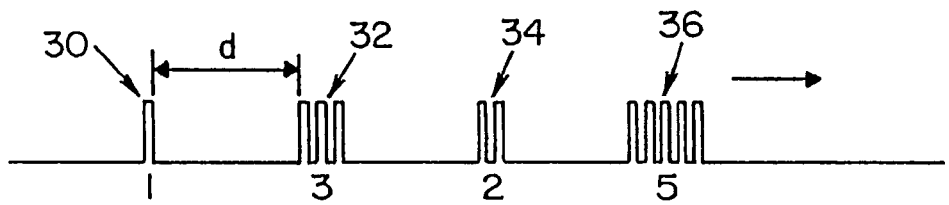
FIG. 3 schematically illustrates information encoded on the wire using Manchester encoding technology.
Figure 4:
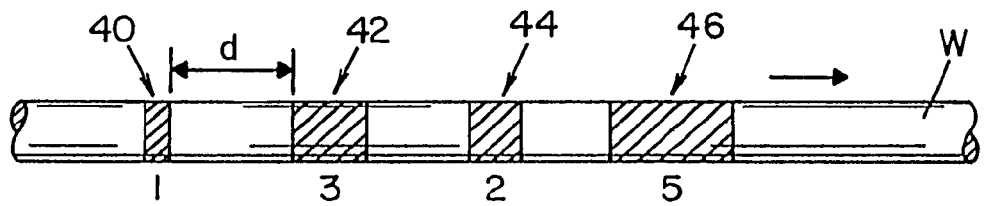
FIG. 4 schematically illustrates encoded information on the wire in the form of magnetic pulses of different pulse widths.
Figure 5:
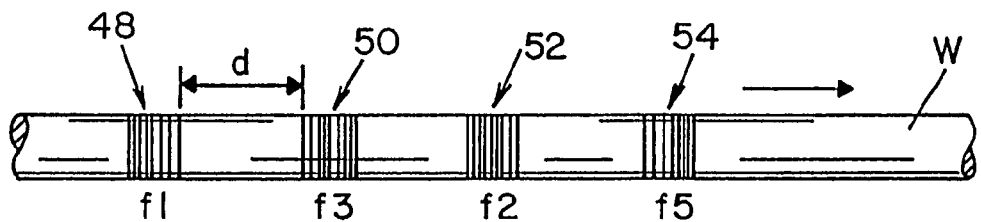
FIG. 5 schematically illustrates encoded information on the wire in the form of magnetic pulses of different frequencies.

In the embodiment of FIGS. 1–5, the coded information imprinted on wire W is one or more sequentially imprinted magnetic pulses providing code segments which, in FIGS. 3–5, are designated by the numerals 1, 3, 2, and 5. It will be appreciated that each of these segments represent a different bit of information regarding wire W. As will be appreciated from the foregoing description of FIG. 1, counter 20 enables encoder 18 based on the timing of oscillator 22 and sets the time and thus the distance d between the sequentially imprinted code segments, and switch 14 is turned on and off in accordance with the output from encoder 18 through line 26 so as to imprint the magnetic pulse or pulses of each segment as well as to provide the distance d between the segments. Typically, the information imprinted on wire W from encoder 18 and/or writer 23 is simultaneously outputted from encoder 18 through line 27 and encoded in a memory device 28 such as a Touch Memory button, RFID tag or card, or a bar code label or tag.

FIG. 3 shows a code imprinted on wire W by Manchester encoding technique and comprised of code segments 30, 32, 34, and 36 respectively comprised of 1, 3, 2, and 5 transitions from one magnetic polarity to the other, whereby it will be appreciated that the different number of transitions in each code segment represents a different bit of information pertaining to electrode W. FIG. 4 shows a code comprised of segments 40, 42, 44, and 46 each comprised of a magnetic pulse having a different pulse width in the direction of movement of the wire electrode. Based on the unit width of 1 for segment 40, segments 42, 44 and 46 respectively are multiples of the unit width by 3, 2 and 5. Again, each code segment represents a different bit of information regarding the welding wire. In FIG. 5, the code segments 48, 50, 52, and 54 are shown as magnetic pulses having different frequencies as represented by the designations f1, f3, f2, and f5. Again, the different segments represent different bits of information pertaining to the welding wire.

Figure 6:
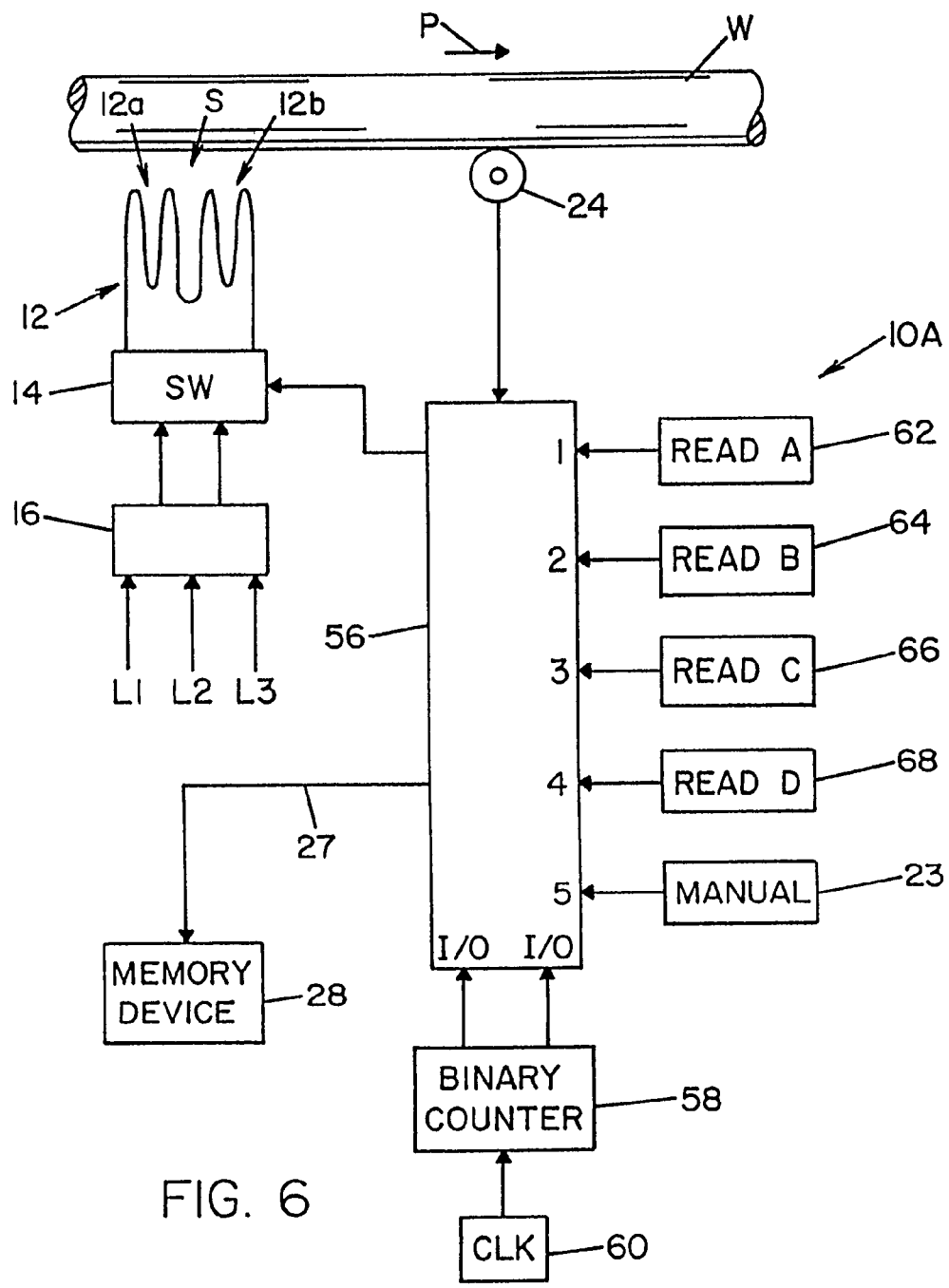
FIG. 6 schematically illustrates apparatus for magnetically imprinting a binary code on welding electrode wire.
Figure 7:
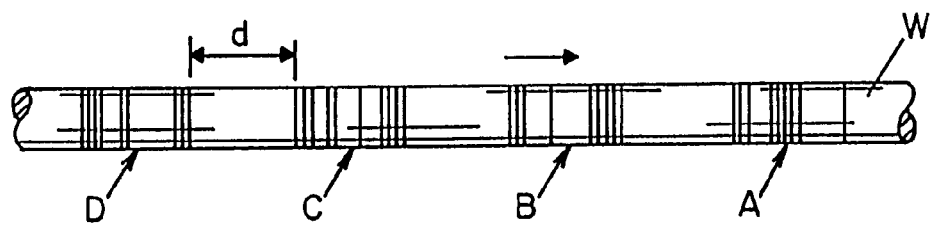
FIG. 7 schematically illustrates encoded information on the wire in the form of magnetic pulses having different binary values.

FIG. 6 illustrates an arrangement for imprinting a plurality of magnetic code segments on a welding wire and wherein the segments have different binary values such as different binary numbers. A number of component parts of the encoding arrangement shown in FIG. 6 correspond to those in the arrangement shown in FIG. 1, whereby the corresponding components are designated in FIG. 6 by the same numerals appearing in FIG. 1. In the embodiment of FIG. 6, encoding unit 10A comprises encoder 56, binary counter 58 and clock 60, and a series of code storing components 62, 64, 66, and 68 which respectively store binary codes A, B, C, and D for imprinting on welding wire W. Encoding unit 10A is activated in response to the movement of wire W along path P by movement sensing device 24 in the manner described hereinabove in connection with FIG. 1 and, when activated, operates to imprint binary codes A, B, C, and D on wire W as depicted in FIG. 7. In particular in this respect, clock 60 determines the space d between the code segments and counter 58 enables the sequential output of code segments A, B, C, and D from encoder 56 to switch 14 for imprinting on wire W. Further, as described in connection with FIG. 1, sensor 24 provides input to encoder 56 which enables the imprinting of tracking information on the wire. As with the code segments in FIGS. 3–5, each of the segments A, B, C, and D represents a bit of information pertaining to welding wire W. In this respect, and by way of example only, binary code A can identify the manufacturer and/or manufacturing location, and binary codes B, C and D can identify non-variable characteristics of the wire which are relevant to operating welding apparatus so as to obtain the highest quality work and optimum performance of the apparatus and which, in this respect, might identify the alloy of the wire, the specified wire diameter and a suitable welding procedure for the specified wire diameter. Again, codes A, B, C, and D provide a predetermined menu of information for encoding on the welding wire, and additional and/or other information pertaining to wire W can be encoded thereon through the use of writing device 23 in the manner and for the purpose set forth with respect thereto in connection with: the description of FIG. 1. It will likewise be appreciated that the information imprinted on wire W can be recorded simultaneously on a memory device 28 as described hereinabove.

As illustrated in FIGS. 1–7, coded information is imprinted on the wire W as the wire passes coil 12. As can be appreciated, coded information can be alternatively or additionally imprinted on wire W in other manners. For example, the welding wire can be marked with a visual marker (e.g. paint, etc.) which is used to indicate information about the welding wire (e.g., variations in the diameter of the wire and the surface condition thereof, a break or breaks in the wire, change in wire composition, end of wire indicator, amount of wire remaining, product designation, the electrode composition, flux composition, etc.). Such markings can be in the form of a bar code, a single mark or series of marks at various locations along the length of the wire, etc. The markings can also or alternatively be in the form of surface indents, channels or ribs formed in the wire. These types of markings can be read by a contact sensor as the wire passes the sensor.

Figure 8:
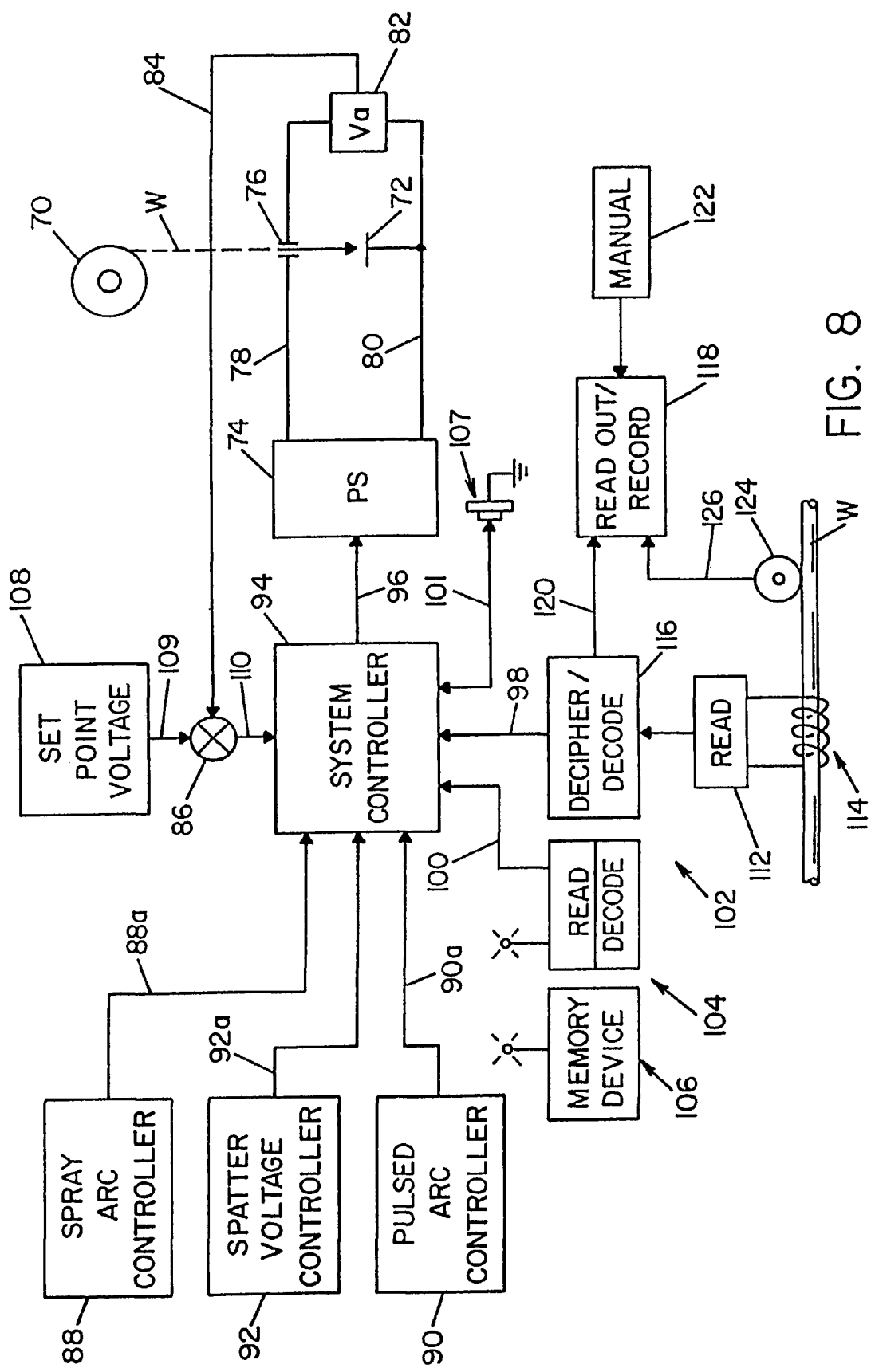
FIG. 8 is a block diagram schematically illustrating electric arc welding apparatus having different modes of operation and bar codes and other reading and deciphering components for shifting the apparatus between the modes of operation.

FIG. 8 schematically illustrates the manner in which operating conditions and/or different operating modes in an electric arc welding process can be monitored and/or controlled in accordance with coded information pertaining to a welding wire electrode to be used in the process. More particularly in this respect, FIG. 8 illustrates by way of example an electric arc welding system including a welding station to which electrode wire W is fed from a reel 70 and at which the electrode and a workpiece 72 are connected to power supply 74. More particularly in this respect, electrode wire W passes through a contact sleeve 76 connected to power supply 74 by a line or lead 78, and workpiece 72 is connected to the power supply by line 80. For determining the actual arc voltage Va, a voltage sensing device 82 is provided in series with lines 78 and 80 and has an output line 84 for directing the arc voltage signal to a comparator 86 for the purpose set forth hereinafter.

Figure 9:
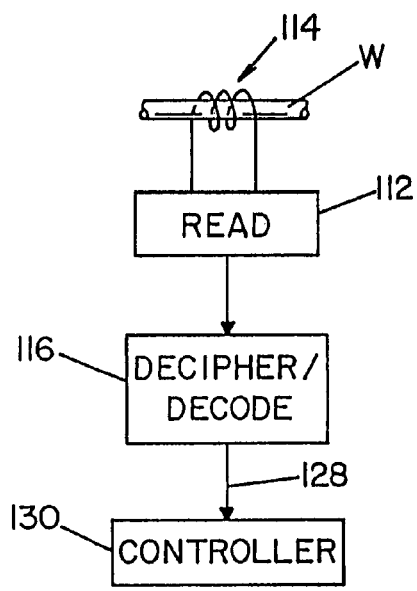
FIG. 9 is a block diagram schematically illustrating use of the code reading and deciphering components for controlling operating parameters of welding apparatus.

In FIG. 8, the welding system is shown as having a plurality of operating conditions including different operating modes which are controlled in accordance with the present invention as set forth hereinafter, and FIG. 8 in conjunction with FIG. 9 shows application of the present invention to control operating conditions in the form of operating parameters which can be controlled in conjunction with or independent of the operating modes. With reference first to FIG. 8, the welding system is shown, for purposes of example only, to be operable in a spray arc mode through a spray arc controller 88, in a pulsed arc mode through a pulsed arc controller 90, and in a spatter mode through a spatter voltage controller 92. Each mode controller is operable through a system controller 94 to output the corresponding control program to power supply 74 through line 96. More particularly in this respect, each of the controllers 88, 90 and 92 is operable to output a signal to system controller 94 through the corresponding output line 88a, 90a and 92a which signal corresponds to coded information pertaining to an electrode suitable for the corresponding mode of operation. Coded information pertaining to the electrode wire W on reel 70 is inputted to system controller 94 through a line 98 and/or a line 100 and/or a line 101. Lines 98 and 100 are respectively associated with a reading and decoding device 102 for reading coded information magnetically imprinted on wire W, and a reading and decoding device 104 for the non-contact reading of coded information on a memory device 106 which, while shown as an RFID tag or card, could be a bar code, or the like painted and/or adhesively attached to the wire. Line 101 is associated with a Touch Memory button 107. System controller 94 is programmed to compare the coded information pertaining to wire W with the mode controller input signals, and when the input signal from one of the mode controllers is the same as the input signal pertaining to wire W the system controller is operable to connect the corresponding mode controller to power supply 74 for the welding process to operate in accordance with the control program for the corresponding mode. It should be noted at this point that no magnetic code on wire W or the absence of a memory device 106 or 107 is, for purposes of the present invention, a code which indicates to controller 94 that there is no information available from the electrode, or otherwise, pertaining to wire W. In accordance with the present invention, microprocessor controller 94 is operable in response to the absence of information pertaining to welding wire W or to information other than that pertaining to the available operating modes to shift the welding system to a voltage mode of operation in which the feedback arc voltage through line 84 to comparator 86 is compared therein with a reference voltage inputted thereto through line 109 from a set point voltage device 108 such as a potentiometer. Comparator 86 outputs a different signal to system controller 94 through line 110, whereby controller 94 outputs a control signal through line 96 to power supply 74 for the latter to appropriately adjust the arc voltage. As can be appreciated, the coded information on the wire can be used to notify or warn an operator and/or activate a signal or alarm. For example, when the end or near end of the wire is coded with information that indicates that the end of the wire on a reel or in a container is near, the read coded information can be used to set off an indicator light and/or alarm to inform an operator that the wire reel or container must soon be changed.

Figure 21:
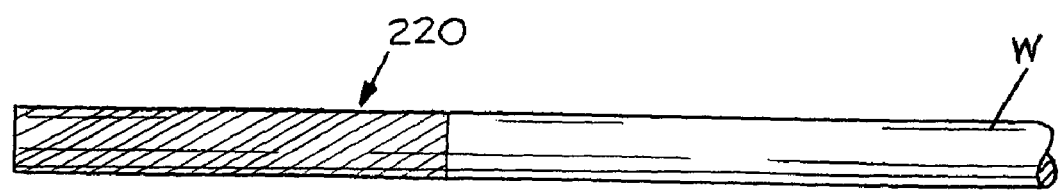
FIG. 21 schematically illustrates information in the form of colored markings on the wire to indicate the end of the wire; and, FIG. 22 schematically illustrates information in the form of notches on the wire to indicate the end of the wire.
Figure 22:
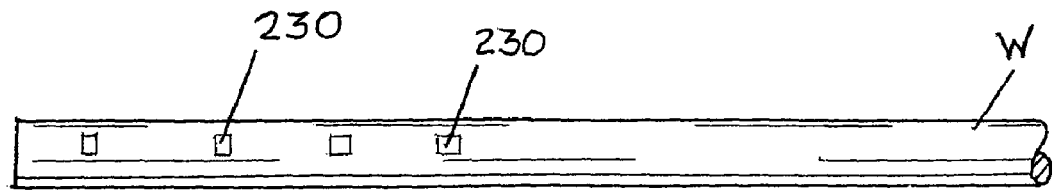

Reading unit 102 includes a reader 112 having a read coil 114 through which wire W passes, and it will be noted that the adjacent coil portions of coil 114 do not have to be reversely oriented as do the coil portions of encoder coil 12 described herein in connection with FIG. 1. The reading unit further includes a decipher/decode component 116 by which signals corresponding to the coded information extracted from wire W are inputted to microprocessor 94 through line 98. As can be appreciated, reader 112 can also or alternatively include a visual sensor (e.g., camera, light scanner, etc.) to read visual indicators or markers on the wire (e.g. bar code, colored markings, etc.). As illustrated in FIG. 21, a portion of wire W can be color coded 220 to provide information about the wire. In FIG. 21, the color coding 220 is located at the end of the wire to indicate that the end of the wire is near. As can be appreciated, different colors, color patterns, etc. can be used to provide various types of information about the wire. Furthermore, it can be appreciated that reader 112 can also or alternatively include a contact sensor to detect visual markers in the form of coded physical markings on the wire (e.g., indents, notches, ribs, etc.). As illustrated in FIG. 22, a portion of wire W can include one or more notches 230 to provide information about the wire. In FIG. 22, notches 230 are located at the end of the wire to indicate that the end of the wire is near. As can be appreciated, different sized and/or shaped notches, different notch spacing or patterns, etc. can be used to provide various types of information about the wire. Typically, a readout/record component 118 is provided at the point of use for receiving signals corresponding to the information extracted from wire W through line 120 and enabling a visual and/or printed output of the information. Information relative to the use of the wire, such as date and time information, operating personnel, type of welding process, type of workpiece, type of weld, wire feed rate, and the like can be input to the readout/record component 118 by a manually actuated writing component 122, and a wire actuated sensor 124 inputs information to readout/record component 118 through line 126 to enable tracking the amount of wire used, anticipating the location in the reel of wire of an anomaly such as a wire break, locations along the length of the wire where adjustment of the process is required to compensate for changes in wire diameter, wire type, and the like. Further, system controller 94 can write back to Touch Memory button 107 such as for tracking the amount of wire used, and the like. Another operating mode, not shown in FIG. 8, could be that of surface tension transfer welding using the STT welder of the Lincoln Electric Company of Cleveland, Ohio. In the STT process, the arc current wave shape is a controlled parameter and a particular wave shape is dependent on welding electrode wire characteristics.

In addition to shifting the welding apparatus between different operating modes as described above in connection with FIG. 8, the invention is also applicable to the control of welding process parameters in connection with a given mode of operation of the welding apparatus. Such parameters include, for example, current wave shape (e.g. STT welding, etc.), welding wire feed speed, welding angle, arc current, arc voltage, current polarity, gas flow rate, arc length or gap, and the like. Thus, as will be appreciated from FIG. 9, the information pertaining to wire W which is read and/or extracted by reader 112 and deciphered and decoded in component 116 can be outputted through a line 128 directly to a controller 130 for adjusting the corresponding parameter of the welding process. Likewise, it will be appreciated that such information encoded on a memory device 106 or 107 as described above can be outputted from read/decode device 104 directly to a parameter controller 130. While the foregoing description is with respect to automatic control or semi-automatic control of the welding apparatus or process based on the extraction of coded information from devices including the welding wire, it will be appreciated that the read and/or extracted information inputted to read out/record device 118 can be used by an operator of the apparatus to manually select the appropriate mode of operation and/or to manually adjust operating parameters of the process and apparatus.

Figure 12:
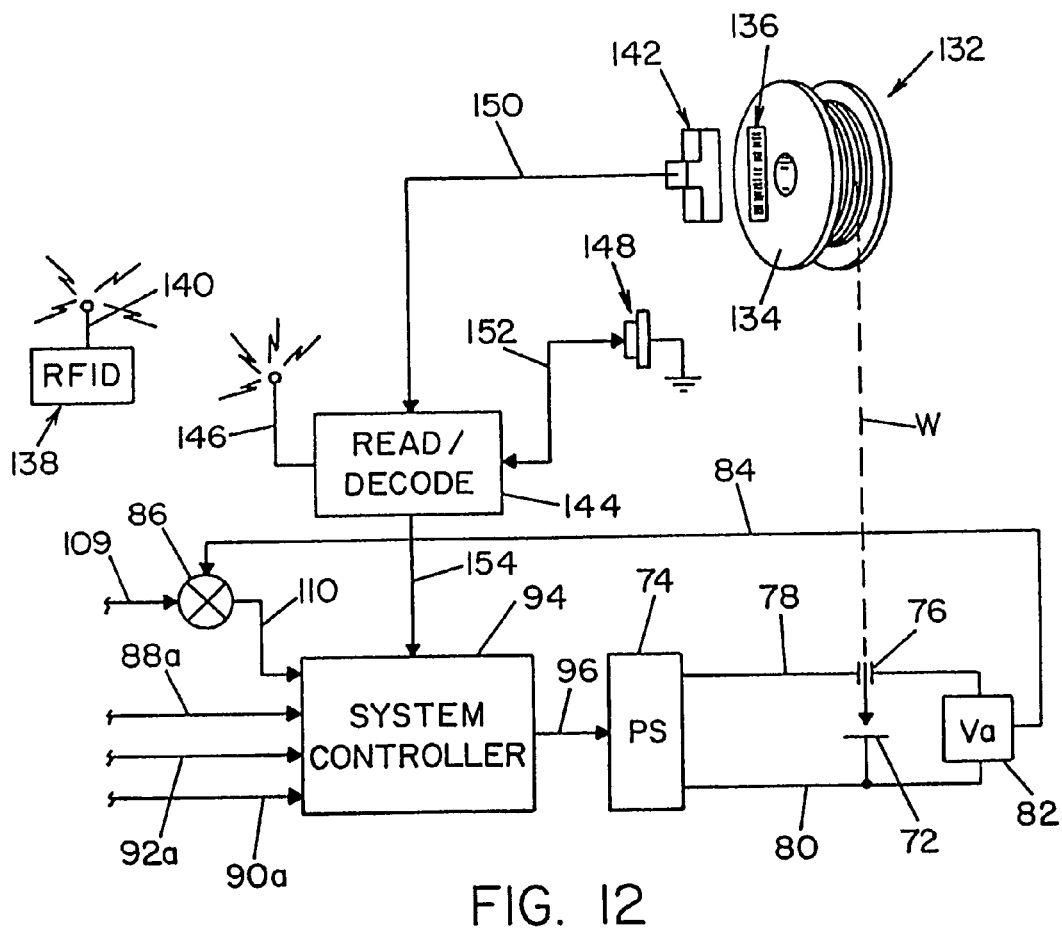
FIG. 12 is a block diagram similar to FIG. 8 and schematically illustrating the control of welding apparatus using encoded devices including a bar code, RFID tag and Touch Memory button.
Figure 10:
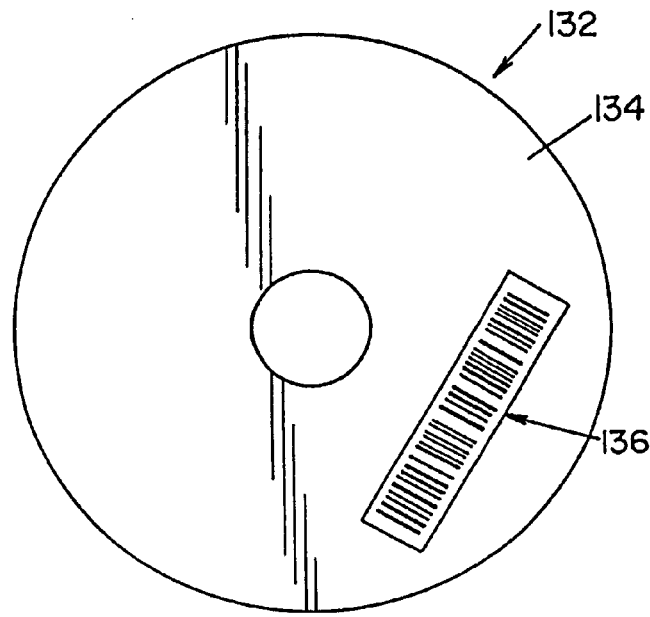
FIG. 10 is an end elevation view of a welding wire reel provided with a bar code for providing information pertaining to welding wire wound on the reel.
Figure 11:
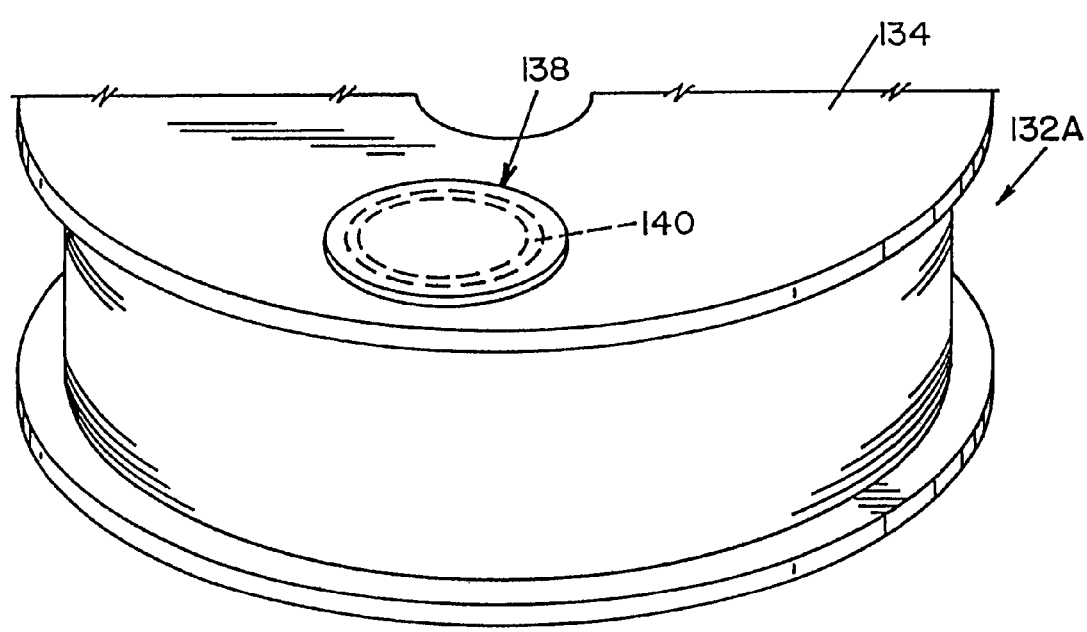
FIG. 11 is a perspective view of a portion of one end flange of a welding wire reel illustrating an RFID tag thereon for providing information pertaining to the wire on the reel.

FIGS. 10 and 11 illustrate welding wire reels 132 and 132A, respectively, having a flange 134 provided with non-contact type memory devices of the character described and discussed hereinabove and containing information pertaining to the welding wire on the reel. In the embodiment of FIG. 10, the memory device is a bar code in the form of a label 136 securely attached to flange 134 such as by an adhesive bond. As can be appreciated, other types of visually coded markings can be used. In the embodiment of FIG. 11, the memory device is an RFID tag or button 138 attached to flange 134 and having an enclosed coil antenna 140. FIG. 12 schematically illustrates the use of bar code 136 and RFID device 138 in connection with controlling the operating mode for the welding system shown and described hereinabove in connection with FIG. 8. Accordingly, corresponding parts of the welding system illustrated in FIG. 8 are designated by the same numerals in FIG. 12, wherein it will be appreciated that signal lines 88a, 90a and 92a are respectively connected to the spray arc controller, pulsed arc controller and spatter voltage controller components shown in FIG. 8 and that signal line 109 is connected to the set point voltage component 108 in FIG. 8.

In FIG. 12, a bar code reader 142 is positioned to read bar code 136 on reel 132 which, while not shown in detail, is in its mounted position on the welding apparatus. FIG. 12 also shows a reader/decoder 144 having an antenna 146 for communicating with RFID tag 138 which, while not shown for purposes of clarity, would be on a wire reel as shown in FIG. 11. Further, FIG. 12 shows a Touch Memory button 148 which, as will become apparent hereinafter, can be mounted on a wire reel such as reel 132 for providing information pertaining to the wire. Reader 142 is connected to read/decode component 144 by line 150 and Touch Memory button 146 is connected to the read/decode component by line 152, whereby the information pertaining to electrode wire W extracted from the corresponding memory device is transmitted to and decoded in component 144 and then outputted through line 154 to system controller 94 as a control signal for determining the mode of operation of the arc welding system. Again, while not shown, the memory and reading devices in FIG. 12 can operate to control operating parameters in connection with a given mode of operation of the welding process as described hereinabove in connection with FIG. 9. Furthermore, as described in connection with FIG. 8, the information extracted from the encoded device can be displayed and/or printed to enable manual selection of a mode of operation and/or manual adjustment of operating parameters by the operator of the welding apparatus.

Figure 13:
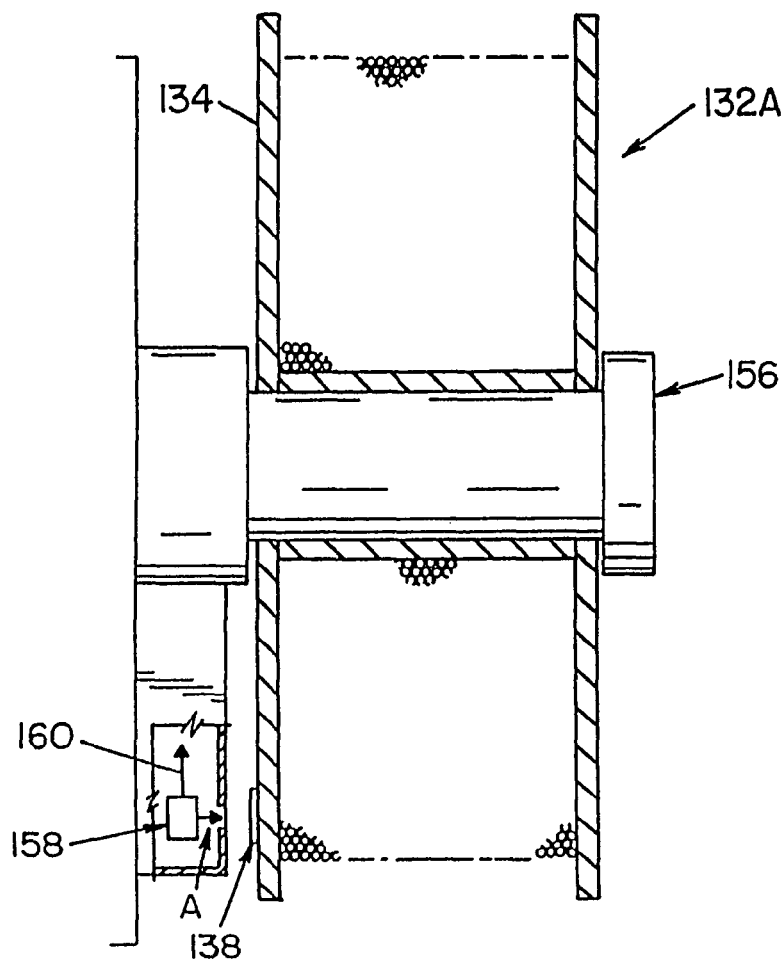
FIG. 13 is a sectional elevation view illustrating the positional relationship between an RFID tag on a reel of welding wire and the tag reader.
Figure 13A:
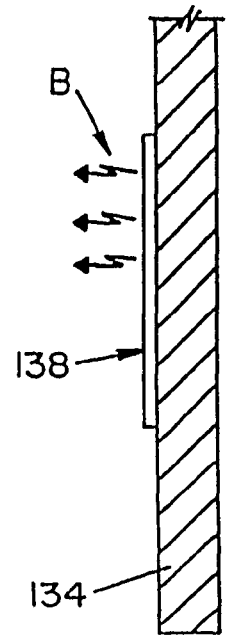
FIG. 13A is an enlarged sectional elevation view of the portion of the reel in FIG. 13 on which the RFID tag is mounted.
Figure 13B:
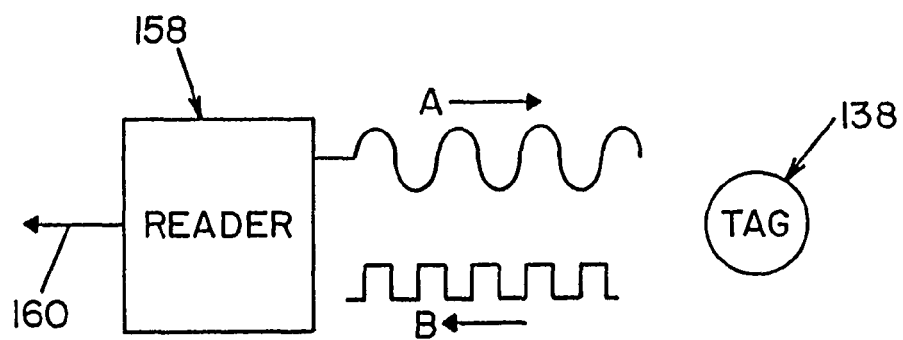
FIG. 13B schematically illustrates the signal transmitting and receiving functions of the reader and tag.

FIG. 13 illustrates reel 132A mounted on a reel support 156 which can be associated with a welding apparatus and a wire feeding mechanism associated therewith. As will be appreciated from the foregoing description regarding FIG. 11, RFID tag 138 is mounted on one of the reel flanges 134 radially outwardly from the axis of rotation of the reel, and a reader 158 for the RFID tag is supported adjacent the reel flange and in a radially outward position relative to reel support 156 which provides for the reader to be aligned with the RFID tag. As will be appreciated from FIGS. 13, 13A and 13B, and as is well known in connection with RFID memory devices, reader 158 produces a low level radio frequency magnetic field transmitted from the reader antenna to the RFID tag as indicated by arrow A in FIGS. 13 and 13B. The antenna in RFID tag 138 receives the magnetic field signal of the reader and converts it to an electrical form by which the integrated circuit in the RFID device is powered. The memory contents in the integrated circuit are then transmitted by the RFID tags antenna back to the reader in an altered form of the magnetic field from the reader as indicated by arrow B in FIGS. 13A and 13B. The electromagnetic signal denotes the data stored in the tag memory, and the data is decoded and transmitted from the reader via line 160 to the system controller as stated hereinabove in connection with FIG. 12.

Figure 14:
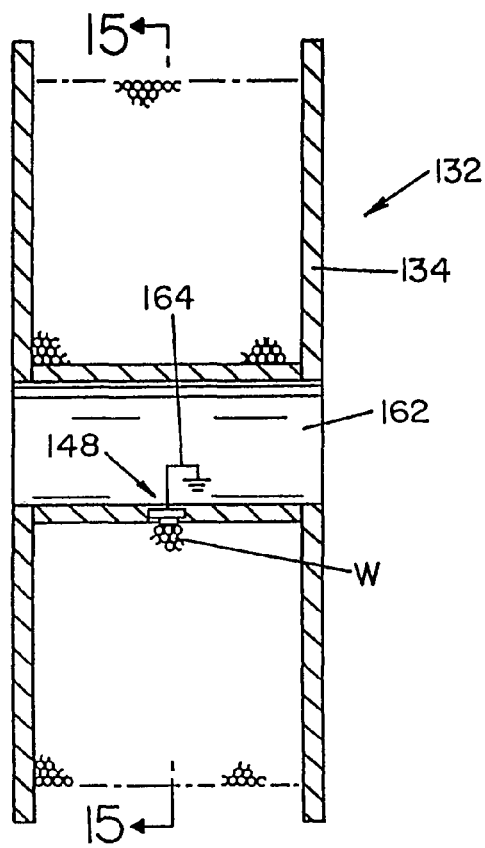
FIG. 14 is a sectional elevation view of a welding wire reel showing a Touch Memory button mounted on the hub thereof.
Figure 15:
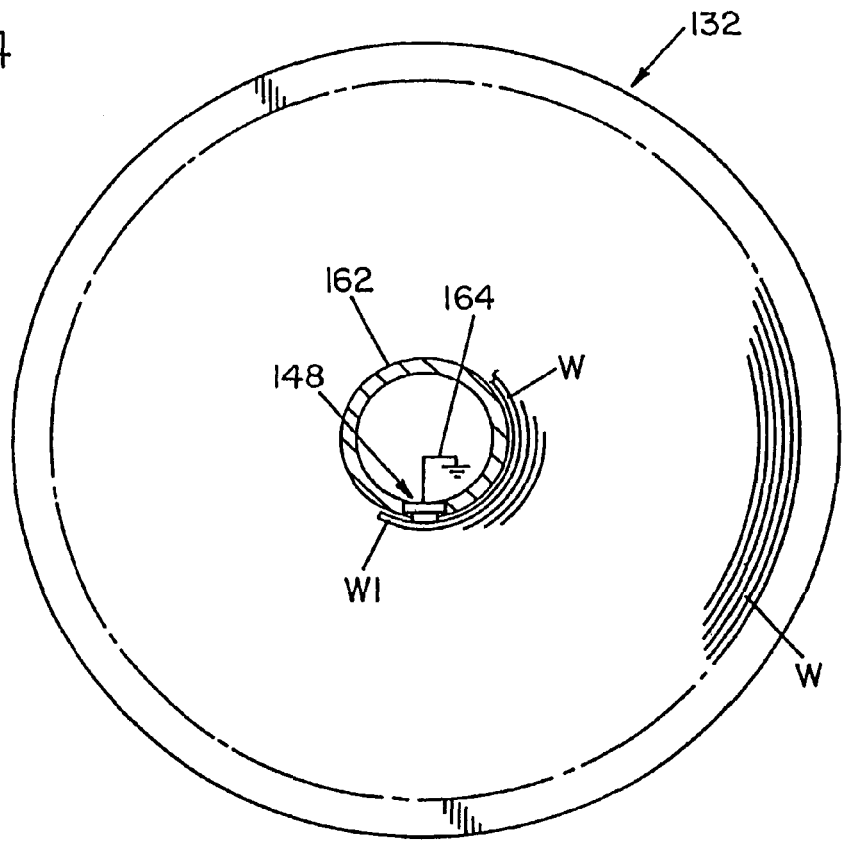
FIG. 15 is a cross-sectional elevation view of the reel taken along line 15—15 in FIG. 14.
Figure 16:
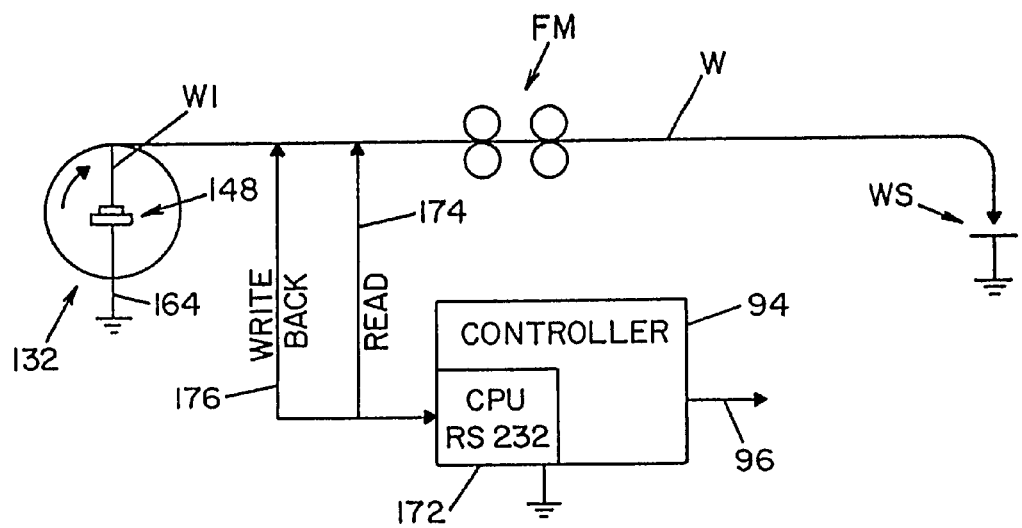
FIG. 16 schematically illustrates the read/write circuit between the Touch Memory button, welding wire and controller for the Touch Memory arrangement shown in FIGS. 14 and 15.
Figure 17:
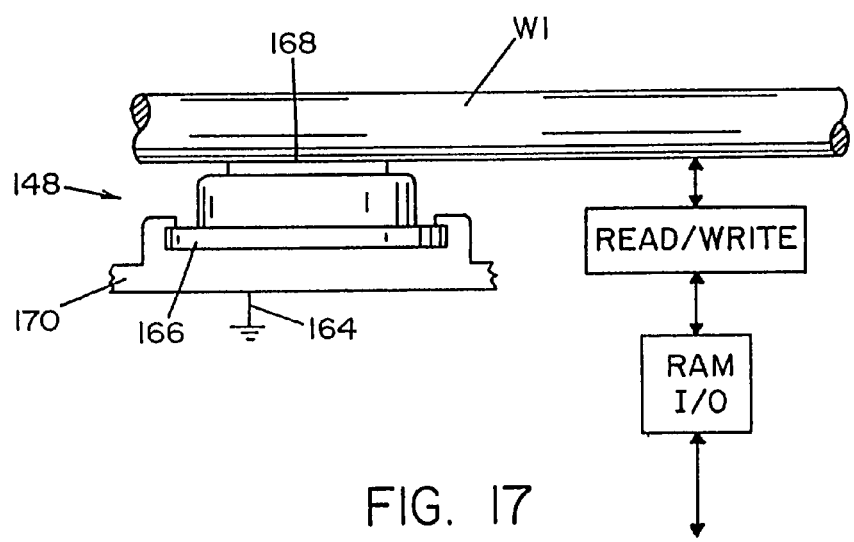
FIG. 17 is an enlarged illustration of the Touch Memory button and welding wire and schematically illustrating the read/write circuitry.

As mentioned hereinabove, Touch Memory button 148 can be mounted on a wire reel for both reading and writing of information pertaining to the wire on the reel, and FIGS. 14 and 15 show one structural arrangement for this purpose. More particularly in this respect, Touch Memory button 148 is mounted in a recess therefor in hub 162 of reel 132, and wire W wound on the reel includes a remote or inner end W1 disposed in electrical contact with the contact or touch side of the button. As is well known, the contact side of the button is adapted to be placed in contact with a low voltage source of up to five volts and across ground 164 to activate the button's memory and, as will become apparent hereinafter, wire W provides read/write line 152 in FIG. 12. More particularly in this respect, as will be appreciated from FIGS. 16 and 17 of the drawing, Touch Memory button 148 basically comprises a semiconductor memory chip, not shown, packaged in a two piece stainless steel canister having a base 166 which includes a mounting flange and provides ground 164, and a touch or contact surface 168 which, as shown in FIGS. 15 and 17, is engaged by remote end W1 of the welding wire wound on the reel. The memory button may, for example, be attached to the hub of reel 132 by a metal mounting component 170 which engages flange 166 and which, as will be apparent from FIG. 17, then provides ground 164 for the memory circuit. As shown in FIG. 16, welding wire W is payed from reel 132 to a welding station WS by a wire feeding mechanism FM, and a central processing unit 172 for the Touch Memory button is operable in conjunction with system controller 94 to output a five volt signal to wire W for activating Touch Memory button 148 through wire end W1 and ground 164. Thereupon, data stored in button 148 can be read by processing unit 172 through line 174 and the processing unit can write back to button 148 through line 176. This advantageously enables maintaining, for example, a record of the amount of wire used and, thus, the amount of wire remaining on the reel at any given time. As another example, the data in the memory of Touch Memory button 148 can include information relevant to locations along the length of the wire at which the welding process should be altered to accommodate, for example, changes in wire diameter whereby, at such locations, controller 94 can make the necessary adjustments through output line 96.

Figure 18:
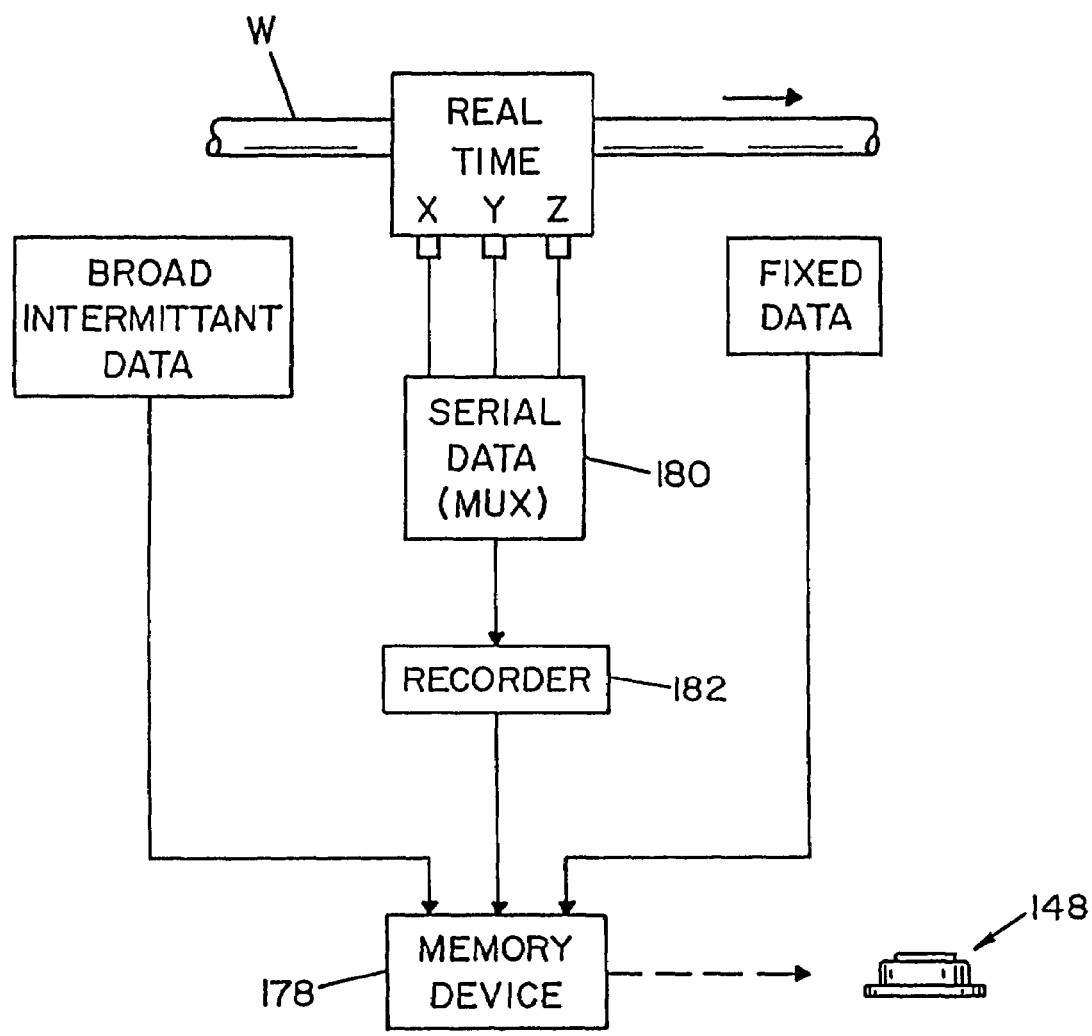
FIG. 18 is a block diagram showing the encoding of information to a memory device.

As will be appreciated from FIG. 18, a memory device 178 which can be the memory component of an RFID tag or a Touch Memory button 148, as shown in FIG. 18, can be encoded with a variety of data at the time of and in connection with manufacturing of wire W. As shown in FIG. 18, such data can include fixed data which, for a given welding wire, does not vary from one reel or barrel to the next such as, for example, the manufacturer's name, the product name, trademark/copyright information, and the like. Intermittent data which relates to a given welding wire and which may vary from one reel or barrel to the next can also be encoded in the memory device including, for example, wire chemistry, a specified wire diameter, the date and time of manufacture, the manufacturing location, and the like. Real time data which needs to be recorded and encoded in the memory device at the time of and in connection with manufacturing of the wire includes, for example, the length of wire on a reel or in a barrel, the actual diameter of the wire at locations along the length thereof, areas along the length of the wire at which an out-of-round condition exists, areas in which the wire is twisted or wound, the location or locations of anomalies such as a wire break, and the like. As will be appreciated from FIG. 18, the latter types of data are processed in a multiplexer 180, serially arranged and recorded in a recorder 182 and then serially encoded in memory device 178. Further information which can be encoded in the memory device for a given welding wire on a reel or in a barrel relates to welding programs and procedures by which, through the process controller 94, welding apparatus is controlled to execute a program read from the memory and which may include, for example, the control of such process parameters as an arc voltage, arc current, arc length, gas flow rate, wire feed rate, globular to spray break over voltage and the like.

Figure 19:
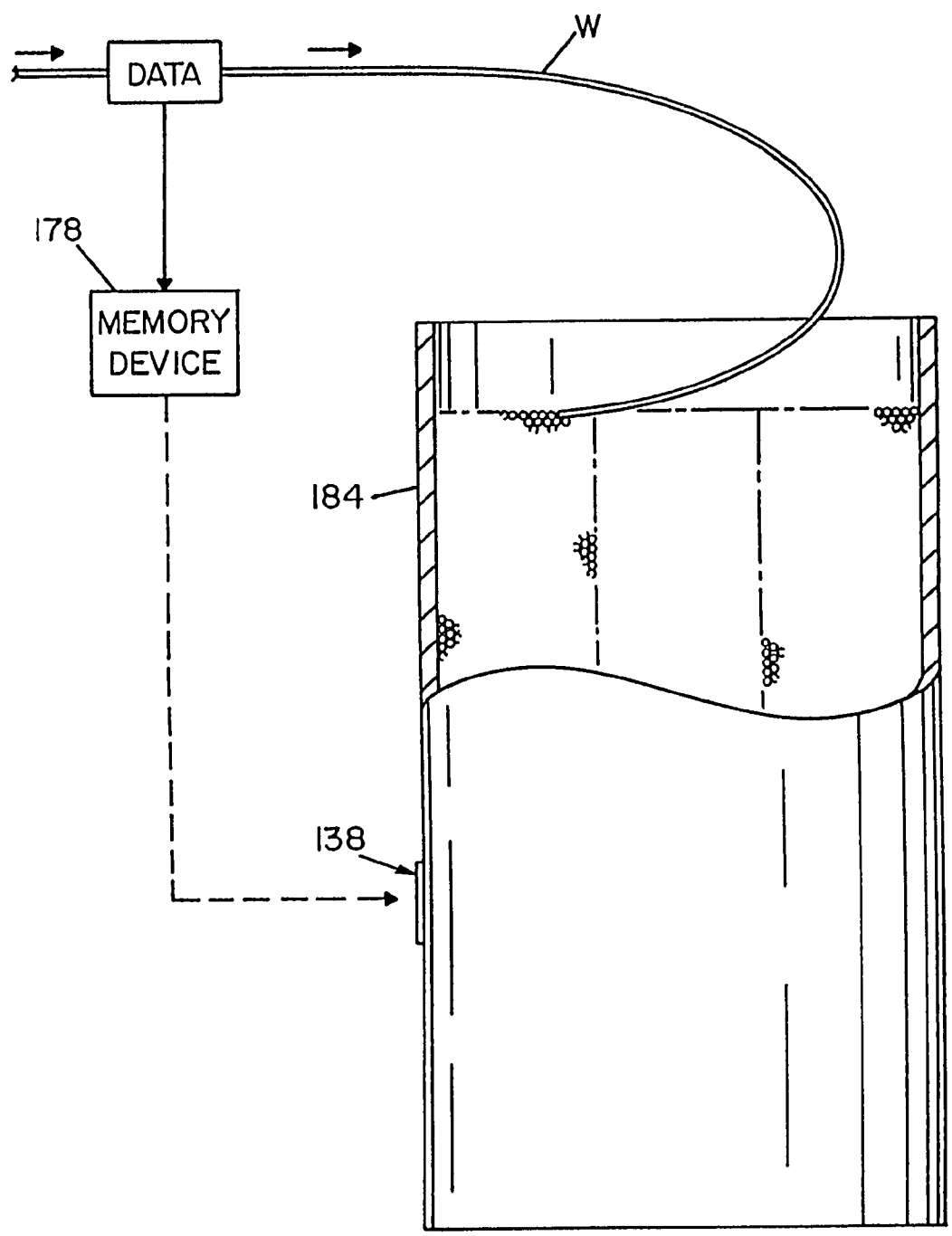
FIG. 19 schematically illustrates the encoding of data into an RFID tag applied to a welding wire storage barrel.

While the description hereinabove is with respect to the encoding of information in the memory of an RFID plate or tag or a Touch Memory button for application to a reel of welding wire, it will be appreciated as schematically shown in FIG. 19, that data corresponding to that described in connection with FIG. 18 can be encoded in memory device 178 in connection with the manufacturing of wire W which is wound into a barrel or drum 184 as opposed to being wound on a reel. As mentioned above in connection with FIG. 18, memory device 178 can be the memory component of an RFID tag such as tag 138 described hereinabove and which, following the wire manufacturing process, would be applied to the side of drum 184. In connection with the use of the drum of wire, the information stored in the memory of tag 138 can be read by an appropriate reader and, if the tag is read/write, it can be written to during use of the wire so as to maintain a record of the amount of wire left in the drum at any given time. Still further, while RFID tag 138 is shown in connection with drum 184, it will be appreciated from the description herein that memory device 178 could be the memory component of a Touch Memory button mounted on or in the barrel and having appropriate connections for the touch surface and ground for accessing the read/write functions thereof.

Figure 20:
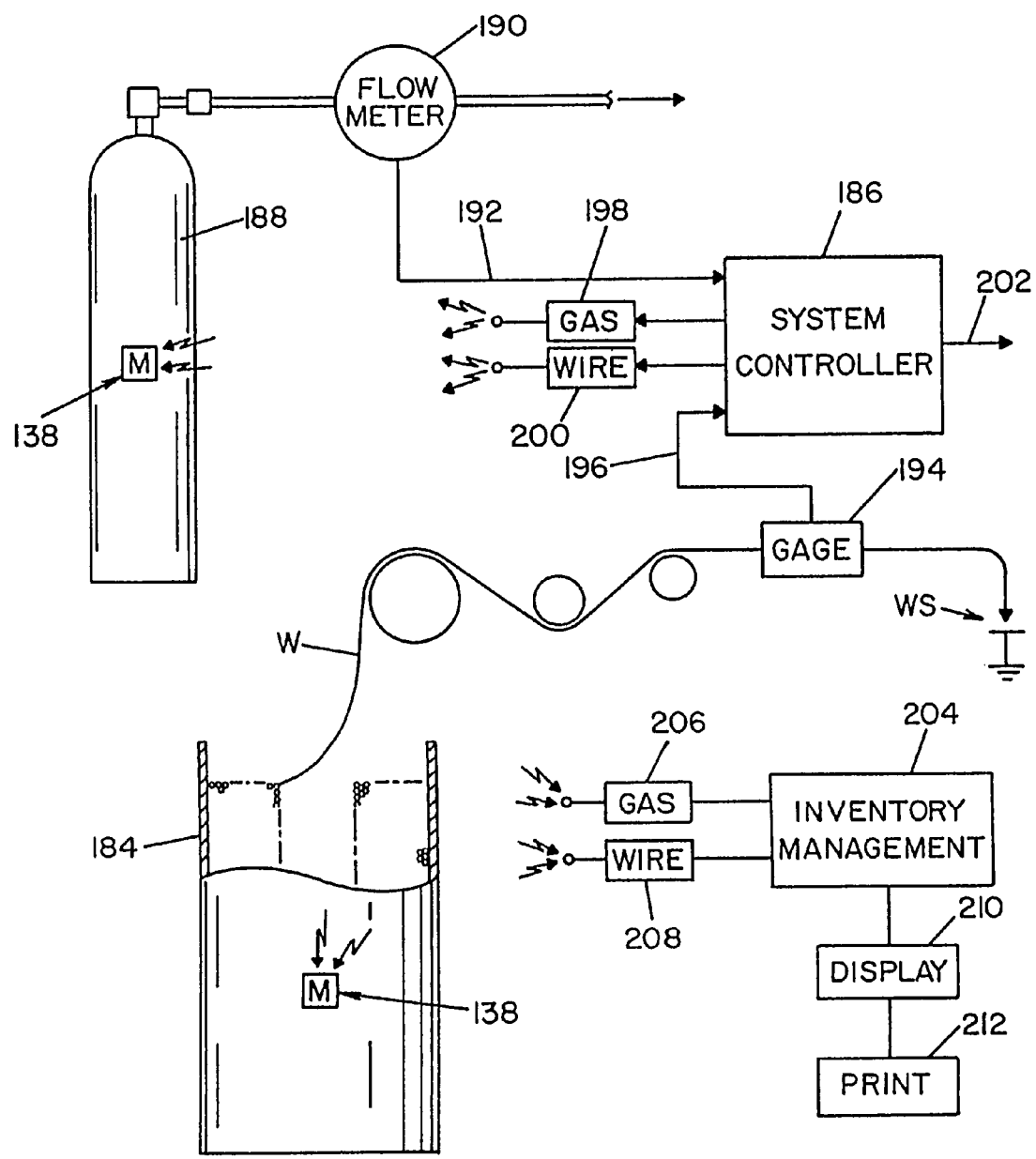
FIG. 20 schematically illustrates an RFID system in connection with controlling a welding process and maintaining inventory management with respect to electrode wire and shielding gas used in the process.

FIG. 20 schematically illustrates the use of RFID tags in connection with controlling a welding process and maintaining an inventory of wire and shielding gas usage in connection therewith. While RFID devices are shown, it will be appreciated that the same process control and consumables inventory maintenance can be achieved using Touch Memory devices. More particularly in this respect, FIG. 20 schematically illustrates a welding system including a system controller 186, a welding wire supply barrel 184 having an RFID tag 138 thereon as described above in connection with FIG. 19, a shielding gas tank 188 having an RFID tag 138 mounted thereon, and a welding station WS to which the welding wire and gas are delivered in connection with performing the welding process. The memory component in RFID tag 138 on tank 188 includes data regarding the amount of gas initially in the tank, and a flow meter 190 is operable during the welding process to output a signal through line 192 to system controller 186 which is indicative of the gas flow rate and thus the quantity of gas used. Wire W is fed to welding station WS through a gauge 194 which is operable during the welding process to transmit a signal through line 196 to system controller 186 which is indicative of the feed rate and thus the length of welding wire used. As can be appreciated, a wire reader such as illustrated in FIG. 8 can also be used to determined the amount of wire used and/or determine when the end of the wire is near. System controller 186 includes a reader 198 for RFID tag 138 on gas tank 188, and a reader 200 for RFID tag 138 on wire barrel 184. In response to the inputs to system controller 186 through lines 192 and 196, readers 198 and 200 respectively write back to RFID tag 138 on tank 188 and RFID tag 138 on barrel 184 to change the corresponding memory for the latter to reflect the usage and provide the current quantity of gas and wire in the respective container. Furthermore, based on the information stored in the memory of RFID tag 138 on wire barrel 184 as described above in connection with FIGS. 18 and 19, system controller 186 is operable through an output line 202 to the welding power supply, gas flow control and wire feeding devices, not shown, to adjust the wire feed speed, gas flow rate and other welding parameters in accordance with the data in the memory component of the RFID tag pertaining to the welding wire.

Further in connection with FIG. 20, an inventory management center 204 is provided with a reader 206 for RFID tag 138 on gas tank 188, and a reader 208 for RFID tag 138 on wire barrel 184. As indicated by the directional arrows in connection with the reader antennas, these readers respectively receive data from the RFID tags on tank 188 and barrel 184 reflecting current quantities of gas and wire in the respective receptacles. This information is transmitted to the inventory management center 204, and the information is available therefrom visually such as on a television screen as indicated by block 210 and/or by printout as indicated by block 212.

The RFID tag, bar code and/or other coded information on the wire reel, wire barrel and/or gas tank can be used to track the shipment of the wire reel, wire barrel and/or gas tank from a manufacturer or storage facility to a welder. This type of tracking provides information to the user concerning available inventory that can be used for a welding operation and/or the location or date of arrival of new inventory for a welding operation. Such inventory tracking can be used to ensure that needed consumables are readily available for used for a particular welding operation in a particular location.

While considerable emphasis has been placed herein on preferred embodiments of the invention, it will be appreciated that other embodiments can be devised and that many changes can be made in the preferred embodiments without departing from the principles of the invention. Accordingly, it is to be distinctly understood that the foregoing descriptive matter is to be interpreted merely as illustrative of the invention and not as a limitation.

What is claimed is:

1. A method of encoding data on a metal welding wire including the steps of:
   a) moving a consumable welding wire along a path;
   b) providing coded information;
   c) providing an encoding mechanism along said path to impart the coded information on said welding wire; and,
   d) activating said encoding mechanism to impart said coded information on said welding wire as said welding wire moves past said encoding mechanism, said coded information includes a magnetic code or magnetic pulse.

2. The method as defined in claim 1, wherein said coded information includes at least one code segment of one of a pulse count, a pulse width, a pulse frequency, a magnetically encoded program, a binary value, and combinations thereof.

3. The method as defined in claim 1, wherein said coded information includes a magnetic code having a plurality of code segments at least partially in the direction of said path.

4. The method as defined in claim 2, wherein said coded information includes at least one code segment of one of a pulse count, a pulse width, a pulse frequency, a binary value, and combinations thereof.

5. The method as defined in claim 1, wherein each of the code segments includes at least one magnetic pulse having a given pulse width in the direction of said path.

6. The method as defined in claim 4, wherein each of the code segments includes at least one magnetic pulse having a given pulse width in the direction of said path.

7. The method as defined in claim 5, wherein said coded information includes a plurality of magnetic pulses having different pulse widths in the direction of said path.

8. The method as defined in claim 6, wherein said coded information includes a plurality of magnetic pulses having different pulse widths in the direction of said path.

9. The method as defined in claim 1, wherein said coded information includes at least one magnetic pulse having a given frequency.

10. The method as defined in claim 4, wherein said coded information includes at least one magnetic pulse having a given frequency.

11. The method as defined in claim 1, wherein said coded information includes at least one binary code.

12. The method as defined in claim 4, wherein said coded information includes at least one binary code.

13. The method as defined in claim 1, wherein said coded information comprises a first code segment having at least one magnetic pulse in the direction of said path and a second code segment spaced from said first code segment in said direction and having a different number of pulses than said first code segment.

14. The method as defined in claim 6, wherein said coded information comprises a first code segment having at least one magnetic pulse in the direction of said path and a second code segment spaced from said first code segment in said direction and having a different number of pulses than said first code segment.

15. The method as defined in claim 1, wherein said coded information comprises a first code segment having a magnetic pulse having a first pulse width in the direction of said path and a second code segment spaced from said first code segment in said direction and having a magnetic pulse having a second pulse width different from said first pulse width.

16. The method as defined in claim 8, wherein said coded information comprises a first code segment having a magnetic pulse having a first pulse width in the direction of said path and a second code segment spaced from said first code segment in said direction and having a magnetic pulse having a second pulse width different from said first pulse width.

17. The method as defined in claim 1, wherein said coded information comprises a first code segment having a magnetic pulse having a first frequency and a second code segment spaced from said first code segment in the direction of said path and having a magnetic pulse having a second frequency different from said first frequency.

18. The method as defined in claim 10, wherein said coded information comprises a first code segment having a magnetic pulse having a first frequency and a second code segment spaced from said first code segment in the direction of said path and having a magnetic pulse having a second frequency different from said first frequency.

19. The method as defined in claim 1, wherein said coded information comprises first and second binary code segments spaced apart in the direction of said path and having different binary values with respect to one another.

20. The method as defined in claim 12, wherein said coded information comprises first and second binary code segments spaced apart in the direction of said path and having different binary values with respect to one another.

21. The method as defined in claim 1, wherein said coded information includes a magnetically encoded program.

22. The method as defined in claim 4, wherein said coded information includes a magnetically encoded program.

23. The method as defined in claim 1, wherein said coded information includes welding parameter information, welding wire information, and combinations thereof.

24. The method as defined in claim 2, wherein said coded information includes welding parameter information, welding wire information, and combinations thereof.

25. The method as defined in claim 4, wherein said coded information includes welding parameter information, welding wire information, and combinations thereof.

26. The method as defined in claim 7, wherein said coded information includes welding parameter information, welding wire information, and combinations thereof.

27. The method as defined in claim 18, wherein said coded information includes welding parameter information, welding wire information, and combinations thereof.

28. The method as defined in claim 20, wherein said coded information includes welding parameter information, welding wire information, and combinations thereof.

29. The method as defined in claim 16, wherein said coded information includes welding parameter information, welding wire information, and combinations thereof.

30. The method as defined in claim 23, wherein said welding wire information includes variations in cross-sectional size of the wire, surface conditions of the wire, breaks in the wire, changes in wire composition, twists in the wire, natural curvature of the wire, end of wire indicator, amount of wire remaining on reel or in canister, wire manufacturer's name, wire manufacturer's location, wire designation, specified wire cross-section shape, specified wire size, wire composition, designated wire feed rate, flux composition in wire, type of wire reel or wire container, date of wire manufacture, at least one welding parameter, type of welder, and combinations thereof.

31. The method as defined in claim 24, wherein said welding wire information includes variations in cross-sectional size of the wire, surface conditions of the wire, breaks in the wire, changes in wire composition, twists in the wire, natural curvature of the wire, end of wire indicator, amount of wire remaining on reel or in canister, wire manufacturer's name, wire manufacturer's location, wire designation, specified wire cross-section shape, specified wire size, wire composition, designated wire feed rate, flux composition in wire, type of wire reel or wire container, date of wire manufacture, at least one welding parameter, type of welder, and combinations thereof.

32. The method as defined in claim 29, wherein said welding wire information includes variations in cross-sectional size of the wire, surface conditions of the wire, breaks in the wire, changes in wire composition, twists in the wire, natural curvature of the wire, end of wire indicator, amount of wire remaining on reel or in canister, wire manufacturer's name, wire manufacturer's location, wire designation, specified wire cross-section shape, specified wire size, wire composition, designated wire feed rate, flux composition in wire, type of wire reel or wire container, date of wire manufacture, at least one welding parameter, type of welder, and combinations thereof.

33. The method as defined in claim 25, wherein said welding wire information includes variations in cross-sectional size of the wire, surface conditions of the wire, breaks in the wire, changes in wire composition, twists in the wire, natural curvature of the wire, end of wire indicator, amount of wire remaining on reel or in canister, wire manufacturer's name, wire manufacturer's location, wire designation, specified wire cross-section shape, specified wire size, wire composition, designated wire feed rate, flux composition in wire, type of wire reel or wire container, date of wire manufacture, at least one welding parameter, type of welder, and combinations thereof.

34. The method as defined in claim 1, wherein said coded information is correlated to an area of or position on said welding wire.

35. The method as defined in claim 4, wherein said coded information is correlated to an area of or position on said welding wire.

36. The method as defined in claim 2, wherein said coded information is correlated to an area of or position on said welding wire.

37. The method as defined in claim 31, wherein said coded information is correlated to an area of or position on said welding wire.

38. The method as defined in claim 32, wherein said coded information is correlated to an area of or position on said welding wire.

39. The method as defined in claim 33, wherein said coded information is correlated to an area of or position on said welding wire.

40. A method of controlling an electric arc welding process having a plurality of operating conditions and wherein a welding wire is advanced toward a workpiece and a welding arc is established between the advancing welding wire and the workpiece, including the steps of:
  a) scanning a welding accessory for coded information on said welding accessory, said welding accessory including said welding wire, a wire reel, a shielding gas, a shielding gas container, and combinations thereof, said coded information including a code segment at least partially in the form of a pulse count on said welding wire, a code segment at least partially in the form of a pulse width on said welding wire, a code segment at least partially in the form of a pulse frequency on said welding wire, a code segment at least partially in the form of a program on said welding wire, a code segment at least partially in the form of a binary value on said welding wire, a code segment at least partially in the form of a bar code on said welding wire, a code segment at least partially in the form of a visual marker on said welding wire, a code segment at least partially in the form of a RFID component on said wire reel, a code segment at least partially in the form of a RFID component on said shielding gas container, a code segment at least partially in the form of an IC component on said wire reel, a code segment at least partially in the form of an IC component on said shielding gas container, a code segment at least partially in the form of a Touch Memory component on said wire reel, a code segment at least partially in the form of a Touch Memory component on said shielding gas container, and combinations thereof; and,
  b) monitoring, controlling and/or selecting at least one of the plurality of operating conditions in response to said coded information obtained from said welding accessory.

41. The method as defined in claim 40, wherein said coded information includes variations in cross-sectional size of the wire, surface conditions of the wire, breaks in the wire, changes in wire composition, twists in the wire, natural curvature of the wire, end of wire indicator, amount of wire remaining on reel or in canister, wire manufacturer's name, wire manufacturer's location, wire designation, specified wire cross-section shape, specified wire size, wire composition, designated wire feed rate, flux composition in wire, type of wire reel or wire container, at least one welding parameter, type of welder, date of wire manufacture, gas type, gas pressure, designated gas flow rate, gas manufacturer, canister filling date, canister filling location, canister volume, canister type, gas volume, at least one welding parameter, type of welder, low gas indication threshold, and combinations thereof.

42. The method as defined in claim 40, including the step of imparting said coded information on said welding wire.

43. The method as defined in claim 41, including the step of imparting said coded information on said welding wire.

44. The method as defined in claim 42, wherein said coded information is at least partially magnetically imparted on the welding wire.

45. The method as defined in claim 43, wherein said coded information is at least partially magnetically imparted on the welding wire.

46. The method as defined in claim 40, including the further steps of comparing the obtained information with preselected information; and, selecting, monitoring, and/or controlling said at least one operating condition based on said comparison.

47. The method as defined in claim 45, including the further steps of comparing the obtained information with preselected information; and, selecting, monitoring, and/or controlling said at least one operating condition based on said comparison.

48. The method as defined in claim 40, wherein said coded information is at least partially on a component positioned on a container for said welding wire; and, scanning the component on said container to obtain information therefrom pertaining to said welding wire.

49. The method as defined in claim 45, wherein said coded information is at least partially on a component positioned on a container for said welding wire; and, scanning the component on said container to obtain information therefrom pertaining to said welding wire.

50. The method as defined in claim 47, wherein said coded information is at least partially on a component positioned on a container for said welding wire; and, scanning the component on said container to obtain information therefrom pertaining to said welding wire.

51. The method as defined in claim 40, wherein said coded information is at least partially on a component positioned on a container for said shielding gas; and, scanning the component on said container to obtain information therefrom pertaining to said shielding gas.

52. The method as defined in claim 45, wherein said coded information is at least partially on a component positioned on a container for said shielding gas; and, scanning the component on said container to obtain information therefrom pertaining to said shielding gas.

53. The method as defined in claim 45, wherein said coded information is at least partially on a component positioned on a container for said shielding gas; and, scanning the component on said container to obtain information therefrom pertaining to said shielding gas.

54. The method as defined in claim 50, wherein said coded information is at least partially on a component positioned on a container for said shielding gas; and, scanning the component on said container to obtain information therefrom pertaining to said shielding gas.

55. A system for controlling an electric arc welding process wherein a welding wire is advanced toward a workpiece and a welding arc is established between the advancing wire and the workpiece comprising a stored source of coded information on a welding accessory, a scanner to scan the coded information and output a signal indicative of said coded information, and a control mechanism to monitor, select and/or control the operation of the welding process in accordance with said signal, said welding accessory including said welding wire, a wire reel, a shielding gas, a shielding gas container, and combinations thereof, said coded information including a code segment at least partially in the form of a pulse count on said welding wire, a code segment at least partially in the form of a pulse width on said welding wire, a code segment at least partially in the form of a pulse frequency on said welding wire, a code segment at least partially in the form of a program on said welding wire, a code segment at least partially in the form of a binary value on said welding wire, a code segment at least partially in the form of a bar code on said welding wire, a code segment at least partially in the form of a visual marker on said welding wire, a code segment at least partially in the form of a RFID component on said wire reel, a code segment at least partially in the form of a RFID component on said shielding gas container, a code segment at least partially in the form of an IC component on said wire reel, a code segment at least partially in the form of an IC component on said shielding gas container, a code segment at least partially in the form of a Touch Memory component on said wire reel, a code segment at least partially in the form of a Touch Memory component on said shielding gas container, and combinations thereof.

56. The system as defined in claim 55, wherein said coded information includes variations in cross-sectional size of the wire, surface conditions of the wire, breaks in the wire, changes in wire composition, twists in the wire, natural curvature of the wire, end of wire indicator, amount of wire remaining on a reel or in a canister, wire manufacturer's name, wire manufacturer's location, wire designation, specified wire cross-section shape, specified wire size, wire composition, designated wire feed rate, flux composition in wire, type of wire reel or wire container, at least one welding parameter, type of welder, date of wire manufacture, gas type, gas pressure, designated gas flow rate, gas manufacturer, canister filling date, canister filling location, canister volume, canister type, gas volume, at least one welding parameter, type of welder, low gas indication threshold, and combinations thereof.

57. The system as defined in claim 55, wherein said coded information includes code segments and the outputted signal is representative of at least one code segment, and a decoder to receive and decode at least one code segment.

58. The system as defined in claim 56, wherein said coded information includes code segments and the outputted signal is representative of at least one code segment, and a decoder to receive and decode at least one code segment.

59. The system as defined in claim 57, wherein said welding apparatus has a plurality of operating parameters, said at least one code segment including information pertaining to at least one of said parameters, said decoder outputting a control signal to said control mechanism indicative of said information pertaining to said at least one parameter.

60. The system as defined in claim 58, wherein said welding apparatus has a plurality of operating parameters, said at least one code segment including information pertaining to at least one of said parameters, said decoder outputting a control signal to said control mechanism indicative of said information pertaining to said at least one parameter.

61. A welder for performing a welding process, said welder comprising a feeder for directing welding wire toward a workpiece from a supply of welding wire in a container, said welding wire including coded information related to the end of the wire in the container, a code reader to detect said coded information, and an indicator that indicates that said container is nearly empty of said wire.

62. The welder as defined in claim 61, wherein said indicator is a visual indicator or an audible indicator.

63. The welder as defined in claim 61, wherein said indicator upon detecting said coded information causes said welder to terminate operation.

64. The welder as defined in claim 62, wherein said indicator upon detecting said coded information causes said welder to terminate operation.

65. A method of encoding data on a metal welding wire including the steps of:
   a) moving a welding wire along a path;
   b) providing coded information, said coded information including information regarding variations in cross-sectional size of the wire, surface conditions of the wire, breaks in the wire, changes in wire composition, twists in the wire, natural curvature of the wire, end of wire indicator, amount of wire remaining on reel or in canister, wire manufacturer's name, wire manufacturer's location, wire designation, specified wire cross-section shape, specified wire size, wire composition, designated wire feed rate, flux composition in wire, type of wire reel or wire container, at least one welding parameter, type of welder, date of wire manufacture, gas type, gas pressure, designated gas flow rate, gas manufacturer, canister filling date, canister filling location, canister volume, canister type, gas volume, at least one welding parameter, type of welder, low gas indication threshold, and combinations thereof;
   c) providing an encoding mechanism along said path to impart the coded information on said welding wire; and,
   d) activating said encoding mechanism to impart said coded information on said welding wire as said welding wire moves past said encoding mechanism, said coded information including a visual marking other than a bar code.

* * * * *